United States Patent
Ganapathiappan et al.

(10) Patent No.: US 11,826,876 B2
(45) Date of Patent: Nov. 28, 2023

(54) HYDROPHILIC AND ZETA POTENTIAL TUNABLE CHEMICAL MECHANICAL POLISHING PADS

(71) Applicant: Applied Materials, Inc., Santa Clara, CA (US)

(72) Inventors: Sivapackia Ganapathiappan, Los Altos, CA (US); Boyi Fu, San Jose, CA (US); Ashwin Chockalingam, Santa Clara, CA (US); Ankit Vora, Bothell, WA (US); Daniel Redfield, Morgan Hill, CA (US); Rajeev Bajaj, Fremont, CA (US); Nag B. Patibandla, Pleasanton, CA (US); Hou T. Ng, Campbell, CA (US); Sudhakar Madhusoodhanan, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1127 days.

(21) Appl. No.: 16/375,506

(22) Filed: Apr. 4, 2019

(65) Prior Publication Data
US 2019/0337117 A1   Nov. 7, 2019

Related U.S. Application Data

(60) Provisional application No. 62/668,244, filed on May 7, 2018.

(51) Int. Cl.
B24B 37/22  (2012.01)
B24B 37/24  (2012.01)
(Continued)

(52) U.S. Cl.
CPC ........... *B24B 7/22* (2013.01); *B22F 10/14* (2021.01); *B24B 37/24* (2013.01); *B24B 37/26* (2013.01);
(Continued)

(58) Field of Classification Search
CPC ....... B29C 64/112; B33Y 70/00; B33Y 10/00; B33Y 80/00; B24B 37/22; B24B 37/24; B24B 37/26
See application file for complete search history.

(56) References Cited

U.S. PATENT DOCUMENTS 5,387,380 A    2/1995   Cima et al.
5,900,164 A    5/1999   Budinger et al.
(Continued)

FOREIGN PATENT DOCUMENTS

CN    1630697 A      6/2005
CN    101437912 A    5/2009
(Continued)

OTHER PUBLICATIONS

ChemSpider—Structures for [2(Methacryloyloxy)ethyl]trimethylammonium methyl sulfate and methacryloyloxyethyl trimethylammonium chloride, retrieved from http://www.chemspider.com/Chemical-Structure.71081.html and http://www.chemspider.com/Chemical-Structure.73368.html (Year: 2022).*
(Continued)

*Primary Examiner* — Jerzi H Moreno Hernandez
(74) *Attorney, Agent, or Firm* — Patterson + Sheridan, LLP

(57) ABSTRACT

In one implementation, a method of forming a porous polishing pad is provided. The method comprises depositing a plurality of composite layers with a 3D printer to reach a target thickness. Depositing the plurality of composite layers comprises dispensing one or more droplets of a curable resin
(Continued)

precursor composition onto a support. Depositing the plurality of composite layers further comprises dispensing one or more droplets of a porosity-forming composition onto the support, wherein at least one component of the porosity-forming composition is removable to form the pores in the porous polishing pad.

19 Claims, 10 Drawing Sheets

(51) Int. Cl.
| | |
|---|---|
| *B33Y 70/00* | (2020.01) |
| *B29C 64/112* | (2017.01) |
| *B33Y 10/00* | (2015.01) |
| *B24B 37/26* | (2012.01) |
| *B24B 7/22* | (2006.01) |
| *B22F 10/14* | (2021.01) |
| *B33Y 80/00* | (2015.01) |
| *B22F 10/12* | (2021.01) |
| *B22F 10/18* | (2021.01) |
| *B22F 10/25* | (2021.01) |
| *B22F 10/28* | (2021.01) |
| *B22F 10/68* | (2021.01) |
| *B22F 12/55* | (2021.01) |
| *B22F 12/58* | (2021.01) |

(52) U.S. Cl.
CPC ............ *B29C 64/112* (2017.08); *B33Y 70/00* (2014.12); *B22F 10/12* (2021.01); *B22F 10/18* (2021.01); *B22F 10/25* (2021.01); *B22F 10/28* (2021.01); *B22F 10/68* (2021.01); *B22F 12/55* (2021.01); *B22F 12/58* (2021.01); *B33Y 10/00* (2014.12); *B33Y 80/00* (2014.12)

(56) References Cited

U.S. PATENT DOCUMENTS

| | | | |
|---|---|---|---|
| 5,932,290 | A | 8/1999 | Lombardi et al. |
| 5,940,674 | A | 8/1999 | Sachs et al. |
| 6,155,910 | A | 12/2000 | Lamphere et al. |
| 6,423,255 | B1 | 7/2002 | Hoechsmann et al. |
| 6,641,471 | B1 | 11/2003 | Pinheiro et al. |
| 6,776,810 | B1 | 8/2004 | Cherian et al. |
| 7,306,637 | B2 | 12/2007 | Cherian et al. |
| 7,530,880 | B2 | 5/2009 | Bajaj et al. |
| 7,531,117 | B2 | 5/2009 | Ederer et al. |
| 7,732,393 | B2 | 6/2010 | Grumbine et al. |
| 7,815,778 | B2 | 10/2010 | Bajaj |
| 7,846,008 | B2 | 12/2010 | Bajaj |
| 8,066,555 | B2 | 11/2011 | Bajaj |
| 8,075,745 | B2 | 12/2011 | Bajaj |
| 8,142,860 | B2 | 3/2012 | Vanmaele et al. |
| 8,177,603 | B2 | 5/2012 | Bajaj |
| 8,292,692 | B2 | 10/2012 | Bajaj |
| 8,497,209 | B2 | 7/2013 | Grumbine et al. |
| 8,715,035 | B2 | 5/2014 | Roy et al. |
| 9,162,340 | B2 | 10/2015 | Joseph et al. |
| 9,630,249 | B2 | 4/2017 | Toyserkani et al. |
| 9,993,907 | B2 | 6/2018 | Murugesh et al. |
| 10,456,886 | B2 | 10/2019 | Ganapathiappan et al. |
| 10,618,141 | B2 | 4/2020 | Chockalingam et al. |
| 11,191,167 | B2 | 11/2021 | Yudovin-Farber et al. |
| 2004/0055223 | A1 | 3/2004 | Ono et al. |
| 2004/0154533 | A1 | 8/2004 | Agarwal et al. |
| 2004/0229552 | A1 | 11/2004 | Cherian et al. |
| 2005/0110853 | A1 | 5/2005 | Gardner et al. |
| 2006/0019587 | A1 | 1/2006 | Deopura et al. |
| 2006/0052040 | A1 | 3/2006 | Prasad |
| 2006/0192315 | A1 | 8/2006 | Farr et al. |
| 2006/0226567 | A1 | 10/2006 | James et al. |
| 2007/0117393 | A1 | 5/2007 | Tregub et al. |
| 2007/0128991 | A1 | 6/2007 | Yoon et al. |
| 2007/0219104 | A1 | 9/2007 | Grumbine et al. |
| 2007/0235904 | A1 | 10/2007 | Saikin |
| 2008/0157436 | A1 | 7/2008 | Patel et al. |
| 2009/0093201 | A1 | 4/2009 | Kazuno et al. |
| 2009/0321979 | A1 | 12/2009 | Hiraide |
| 2010/0200802 | A1 | 8/2010 | Grumbine et al. |
| 2010/0323050 | A1 | 12/2010 | Kumagai et al. |
| 2011/0059247 | A1 | 3/2011 | Kuzusako et al. |
| 2012/0315830 | A1 | 12/2012 | Joseph et al. |
| 2013/0012108 | A1 | 1/2013 | Li et al. |
| 2013/0017769 | A1 | 1/2013 | Kimura |
| 2013/0122705 | A1 | 5/2013 | Babu et al. |
| 2013/0183824 | A1 | 7/2013 | Kwon et al. |
| 2013/0283700 | A1 | 10/2013 | Bajaj et al. |
| 2014/0239527 | A1 | 8/2014 | Lee |
| 2015/0056895 | A1 | 2/2015 | Fotou et al. |
| 2015/0174826 | A1 | 6/2015 | Murugesh et al. |
| 2015/0216790 | A1 | 8/2015 | Feng et al. |
| 2016/0107288 | A1* | 4/2016 | Orilall ................. B24B 37/22 451/529 |
| 2016/0114458 | A1 | 4/2016 | Bajaj et al. |
| 2016/0136787 | A1 | 5/2016 | Bajaj et al. |
| 2016/0229023 | A1 | 8/2016 | Lugg et al. |
| 2017/0100817 | A1* | 4/2017 | Ganapathiappan ...... B24D 3/28 |
| 2017/0120416 | A1* | 5/2017 | Chockalingam ........ B24B 37/22 |
| 2017/0203406 | A1 | 7/2017 | Ganapathiappan et al. |
| 2017/0203408 | A1 | 7/2017 | Ganapathiappan et al. |
| 2017/0259499 | A1 | 9/2017 | Ng et al. |
| 2017/0274498 | A1 | 9/2017 | Oh et al. |
| 2018/0236632 | A1 | 8/2018 | Murugesh et al. |
| 2018/0291219 | A1* | 10/2018 | Kiyosada ............... B33Y 70/00 |
| 2018/0295728 | A1* | 10/2018 | Yudovin-Farber ......................... H05K 3/4664 |
| 2019/0039204 | A1 | 2/2019 | Chockalingam et al. |
| 2019/0224809 | A1 | 7/2019 | Ganapathiappan et al. |
| 2020/0055161 | A1 | 2/2020 | Chockalingham et al. |

FOREIGN PATENT DOCUMENTS

| | | | |
|---|---|---|---|
| CN | 107614265 A | | 1/2018 |
| EP | 2431157 A1 | | 3/2012 |
| JP | 2016-023209 A | | 2/2016 |
| JP | 2017078123 A | | 4/2017 |
| TW | 201726313 A | | 8/2017 |
| TW | 201726325 A | | 8/2017 |
| WO | 03/103959 A1 | | 12/2003 |
| WO | 2008-094702 A1 | | 8/2008 |
| WO | 2009158665 A1 | | 12/2009 |
| WO | 2011/088057 A1 | | 7/2011 |
| WO | 2013162856 A1 | | 10/2013 |
| WO | 2015/111366 A1 | | 7/2015 |
| WO | 2015/120430 A1 | | 8/2015 |
| WO | 2016151586 A1 | | 9/2016 |
| WO | 2017066077 A | | 4/2017 |
| WO | 2017074773 A1 | | 5/2017 |
| WO | 2017-127221 A1 | | 7/2017 |

OTHER PUBLICATIONS

International Search Report and Written Opinion in related application PCT/US2016069193 dated Apr. 11, 2017.
Office Action for U.S. Appl. No. 15/394,044 dated Sep. 10, 2018.
European Search Report issued to Application No. 19800510.0 dated Jan. 14, 2022.
International Search Report and Written Opinion for International Application No. PCT/US2019/025879 dated Jul. 26, 2019.
Japanese Office Action issued to Application No. 2020-562763 dated Feb. 8, 2022.
Chinese Office Action issued to Application No. 201980030585.2 dated Jun. 28, 2022.
Chinese Search Report issued to Application No. 201980030585.2 dated Jun. 16, 2022.
Japanese Office Action issued to Application No. 2020-562763 dated Oct. 4, 2022.
Office Action for Japanese Application No. 2020-562763 dated May 30, 2023.

(56) References Cited

OTHER PUBLICATIONS

Office Action for Chinese Application No. 201980030585.2 dated Feb. 2, 2023.
Office Action for Taiwan Application No. 108112813 dated Feb. 7, 2023.
Search Report for Taiwan Application No. 108112813 dated Feb. 6, 2023.

* cited by examiner

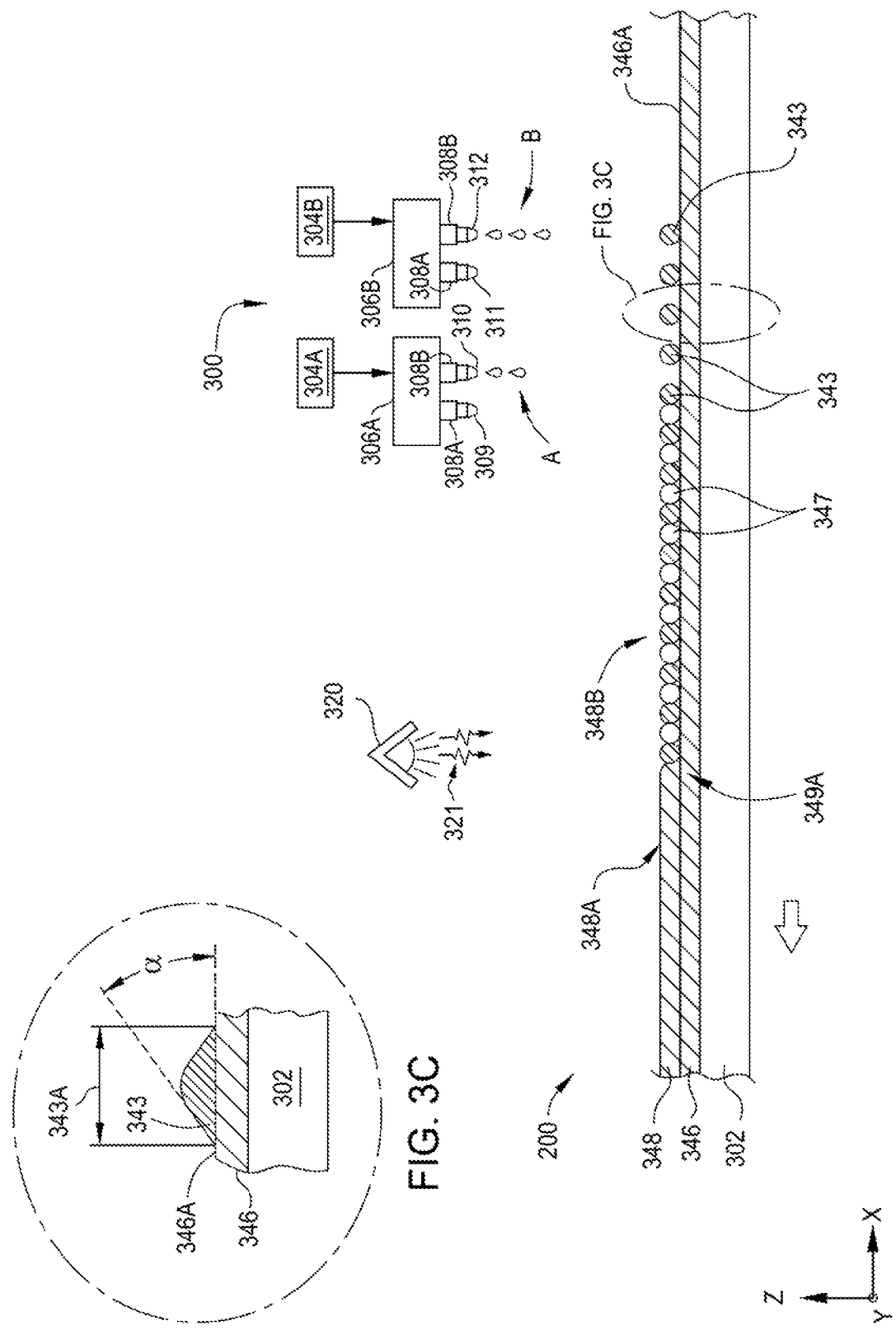

HYDROPHILIC AND ZETA POTENTIAL TUNABLE CHEMICAL MECHANICAL POLISHING PADS

CROSS-REFERENCE TO RELATED APPLICATIONS

This application claims benefit of U.S. provisional patent application Ser. No. 62/668,244, filed May 7, 2018, which is incorporated herein by reference in its entirety.

BACKGROUND

Field

Implementations described herein generally relate to polishing articles and methods of manufacturing polishing articles used in polishing processes and cleaning processes. More particularly, implementations disclosed herein relate to composite polishing articles having tunable properties.

Description of the Related Art

Chemical-mechanical polishing (CMP) processes are commonly used for planarization of substrates during fabrication of semiconductor devices. During CMP processing, a substrate is mounted on a carrier head with the device surface placed against a rotating polishing pad. The carrier head provides a controllable load on the substrate to push the device surface against the polishing pad. A polishing liquid, such as slurry with abrasive particles (e.g., silica ($SiO_2$), alumina ($Al_2O_3$), or ceria ($CeO_2$)), is typically supplied to the surface of the polishing pad.

As feature sizes decrease, planarization of both the front layers and the back layers by CMP processes becomes more critical. Unfortunately, byproducts of the CMP process, for example, abrasive particles and metallic contaminants generated during the CMP process may damage the surface of the substrate. In cases where abrasive polishing slurries are used, these abrasive particles may originate from the polishing slurry. In some cases, the abrasive particles may originate from the polishing pad. Additionally, abrasive particles may originate from the polished surface materials of the substrate and the polishing equipment. These particles may physically attach to the surface of the substrate due to the mechanical pressure generated by the polishing pad. Metallic contaminants arise from the abraded metal lines, metal ions in slurries, and the polishing equipment. These metallic contaminants may embed in the surface of the substrate and are often difficult to remove using subsequent cleaning processes. Current polishing pad designs and post-polishing cleaning processes often yield polished substrates suffering from defects caused by the byproducts of the CMP process.

Therefore, there is a need for a polishing article that provides an improved polishing process with reduced defects and methods for making the improved polishing pad.

SUMMARY

Implementations described herein generally relate to polishing articles and methods of manufacturing polishing articles used in polishing processes and cleaning processes. More particularly, implementations disclosed herein relate to composite polishing articles having tunable properties. In one implementation, a method of forming a porous polishing pad is provided. The method comprises depositing a plurality of composite layers with a 3D printer to reach a target thickness. Depositing the plurality of composite layers comprises dispensing one or more droplets of a curable resin precursor composition onto a support. The curable resin precursor composition comprises:

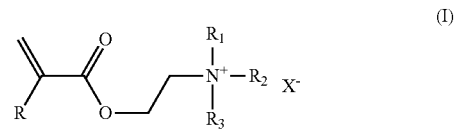

(I)

wherein R is H or $CH_3$, $R_1$, $R_2$, and $R_3$ may be identical or different and may each be, independently of one another, a linear or branched $C_1$ to $C_8$ alkyl group. Depositing the plurality of composite layers further comprises dispensing one or more droplets of a porosity-forming composition onto the support, wherein at least one component of the porosity-forming composition is removable to form the pores in the porous polishing pad.

In another implementation, a method of forming a porous polishing pad is provided. The method comprises depositing a plurality of composite layers with a 3D printer to reach a target thickness. Depositing the plurality of composite layers comprises dispensing one or more droplets of a curable resin precursor composition onto a support. The curable resin precursor composition comprises a first resin precursor component that comprises a multifunctional acrylate oligomer, a second resin precursor component that comprises a multifunctional acrylate monomer, and a cationic monomer having the structure:

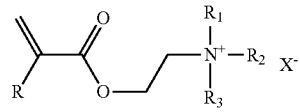

wherein R is H or $CH_3$, $R_1$, $R_2$, and $R_3$ may be identical or different and may each be, independently of one another, a linear or branched $C_1$ to $C_8$ alkyl group. The method further comprises exposing the one or more droplets of the curable resin precursor composition to electromagnetic radiation to at least partially cure the curable resin precursor composition. The method further comprises repeating the dispensing and the exposing to build a 3D-relief on the support. The method further comprises solidifying the plurality of composite layers to form a porous pad body.

In yet another implementation, a method of forming a porous polishing pad is provided. The method comprises depositing a plurality of composite layers with a 3D printer to reach a target thickness. Depositing the plurality of composite layers comprises dispensing one or more droplets of a curable resin precursor composition onto a support, wherein the curable resin precursor composition comprises:

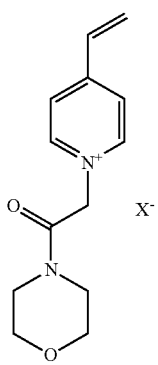

wherein X⁻ may is selected from the group of OH⁻, $CH_3COO^-$, $CF_3COO^-$, $CH_3SO_3^-$, or $CF_3SO_3^-$. Depositing the plurality of composite layers further comprises dispensing one or more droplets of a porosity-forming composition onto the support, wherein at least one component of the porosity-forming composition is removable to form the pores in the porous polishing pad.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 3B is a schematic view of a portion of the system illustrated in FIG. 3A, according to one or more implementations of the present disclosure;

FIG. 3C is a schematic view of a dispensed droplet disposed on a surface of a region of the advanced polishing pad illustrated in FIG. 3B, according to one or more implementations of the present disclosure;

Figure 1:
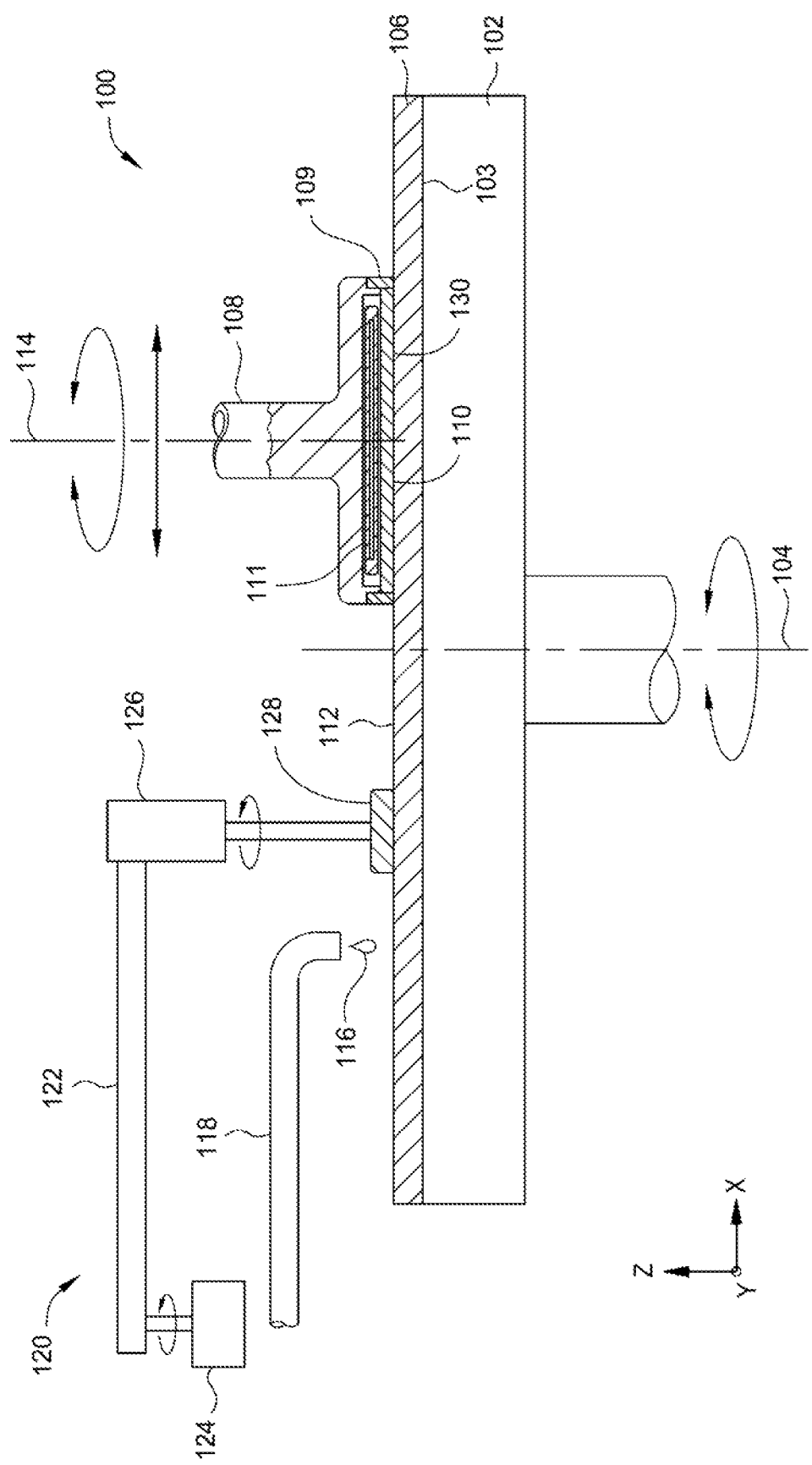
FIG. 1 is a schematic sectional view of a polishing station that may benefit from the polishing pad designs described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

Implementations described herein generally relate to polishing articles and methods of manufacturing polishing articles used in polishing processes and cleaning processes. More particularly, implementations disclosed herein relate to composite polishing articles having tunable properties such as hydrophilicity and zeta potential. 3D printed chemical-mechanical planarization (CMP) pads composed of UV curable acrylic chemistry are generally hydrophobic in nature. Such hydrophobic behavior affects the wetting properties with abrasive-based polishing slurries such as ceria-base slurries. However, in order to increase the planarization and removal rate while decreasing defects, hydrophilic pads are preferred. In addition, it is desirable that the zeta potential (Zp) of the pads be tunable over a wide range of conditions at different pH values. Implementations of the present disclosure include methods for increasing the hydrophilicity and tuning the Zp of the pads with special additives and pads produced using these methods.

Zeta potential is the electrokinetic potential of a solid surface with respect to that of a liquid at the slipping plane. The electrokinetic potential of the solid surface provides an indirect measure of surface functionality. The addition or subtraction of protonated groups on a solid surface generates a charge on the surface. The electrostatics between the solid and liquid interface has a large influence on the charge of the interfacial double layer.

Hydrophilicity can be increased by incorporating highly polar components such as polyethylene glycols, carboxylic acid, sulfonic acid, phosphoric acids and sulfate-containing components in the pad-forming formulation. Not to be bound by theory, but it is believed that addition of surfactants with hydrophilic-lipophilic balance ("HLB") values of 7-9 improve hydrophilicity of the pad surface where a hydrophobic part of the highly-polar component is embedded into the pad matrix and a hydrophilic part of the component is exposed on the pad surface imparting hydrophilicity. Components with HLB values greater than 9 tend to be occluded in the pad matrix. At the same time, components with HLB values less than 7 tend to go to the pad surface after curing, which are hydrophobic. However, in these conventional systems, the surfactant is present as an inert species without chemical bonds to the pad structure. The inert surfactant can be leached out when the material is placed in water. Once the inert surfactant leaches out, the hydrophobicity of the pad increases again. Increasing the cationic components such as quaternary amine substituents in the side chain or main backbone could also increase the hydrophilicity. Cationic components can also increase the positive Zp of the pads. Components with strongly ionic groups such as sulfonic acid, phosphoric acids and sulfate containing constituents can increase the negative Zp for the pads since these moieties exist in the ionic form irrespective of the pH range.

The cationic monomers described herein are miscible with other acrylic components in the pad-forming formulation. Thus, in some implementations, the resin precursor compositions described herein include cationic monomers and one or more of oligomers, non-cationic monomers and photoinitiators that are miscible and thus form a relatively stable homogeneous mixture. The cationic monomers described herein are also stable to heat since the pad-forming formulation is typically jetted at greater than 60 degrees Celsius using piezo inkjet printers. The cationic monomers described herein are typically curable upon exposure to UV or UV LED light. The viscosity of the pad-forming formulations including the cationic monomers described herein is typically in the range of 10 to 30 cP at 70 degrees Celsius in order to jet the pad-forming formulations by ink jet printing. In addition, the pad-forming formulations described herein typically include one or more of photoinitiators, photosensitizers, oxygen scavengers and additional additives to improve performance. During the UV cure process, the photoinitiators and the fragments of the photoinitiators become more mobile and tend to move to the pad surface causing an increase in hydrophobicity at the pad surface. In order to counteract the increase in hydrophobicity, the hydrophilic portions of the cationic monomers have to be flexible enough to overcome this influence. The cationic monomers described herein include both hydrophobic and hydrophilic groups along with UV curable units.

Implementations of the present disclosure provide polishing articles and methods of forming polishing articles that have tunable properties such as increased hydrophilicity and a more positive zeta potential throughout the surface of the polishing article. The hydrophilicity and zeta potential of the polishing article may be tuned to form varying regions of hydrophilicity and zeta potential throughout the surface of the polishing pad. The hydrophilicity and zeta potential of the polishing article may be tuned based on the polishing slurry composition systems used and the materials to be polished. This varying zeta potential may be tuned to transport active slurry to the interface between the polishing article and substrate while removing polishing byproducts and contaminants from the interface. For example, in some implementations, the polishing article has a more positive zeta potential near the polishing surface of the polishing article (i.e. the interface between the polishing article and the liquid interface) and a more negative zeta potential near the bottom of a groove of the polishing article. The more positive zeta potential repels unwanted positively charged ions (e.g., metal ions, dielectric material ions and/or charged particles and slurry abrasive materials found in the slurry during a polishing process) from the liquid interface while the more negative zeta potential attracts the unwanted positive ions toward the bottom of the groove where the collected ions can be removed from the polishing article.

In some implementations where the active slurry contains abrasives having a positive zeta potential (e.g., ceria) the polishing surface may be designed to have a more positive zeta potential relative to other regions of the surface of the polishing article to repulse the abrasive particles from the polishing surface. In some implementations described herein, this tunable zeta potential is achieved by addition of a cationic monomer or zeta potential modifier to the curable resin precursor composition used to form the polishing article. The curable resin precursor composition includes precursors, or resin precursor compositions, that contain "resin precursor components" that include, but are not restricted to functional polymers, functional oligomers, monomers, reactive diluents, flow additives, curing agents, photoinitiators, porosity forming agents, cationic monomer and cure synergists wherein the cationic monomer has an ionic charge (e.g., cationic), which makes the zeta potential of the polishing article more positive by co-polymerization with the prepolymer components of the curable resin precursor composition. The resin precursor components may also include chemically active materials and/or compounds such as functional polymers, functional oligomers, monomers, and reactive diluents that may be at least monofunctional, and may undergo polymerization when exposed to free radicals, Lewis acids, and/or electromagnetic radiation. As one example, an advanced polishing pad may be formed from a plurality of polymeric layers, by the automated sequential deposition of at least one resin precursor composition followed by at least one curing process, wherein each layer may represent at least one polymer composition, and/or regions of different compositions. In some implementations, the layers and/or regions of the advanced polishing pad may include a composite material structure, such as a radiation-cured polymer that contains at least one filler, such as metals, semimetal oxides, carbides, nitrides and/or polymer particles. In some implementations, the fillers may be used to increase abrasion resistance, reduce friction, resist wear, enhance crosslinking and/or thermal conductivity of the entire pad, or certain regions of the pad. Therefore, the advanced polishing pad, including the pad body and discrete features produced over, upon, and within the pad body, may be formed simultaneously from a plurality of different materials and/or compositions of materials, thus enabling micron scale control of the pad architecture and properties.

In one implementation described herein, the curable resin precursor composition comprises a cationic monomer or positive zeta potential modifier of formula (I):

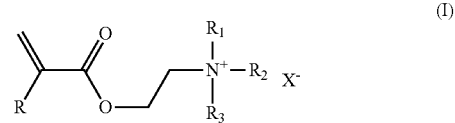

(I)

In one implementation, in formula (I), R, $R_1$, $R_2$, and $R_3$ may be identical or different and may each be, independently of one another, hydrogen, a linear or branched $C_1$ to $C_8$ alkyl group, such as $CH_3$, $C_2H_5$, $C_3H_7$, $C_4H_9$, $C_5H_{11}$, $C_6H_{13}$, $C_7H_{15}$ or $C_5H_{17}$. In one implementation, in formula (I), R is H or $CH_3$, $R_1$, $R_2$, and $R_3$ may be identical or different and may each be, independently of one another, a linear or branched $C_1$ to $C_5$ alkyl group, such as $CH_3$, $C_2H_5$, $C_3H_7$, $C_4H_9$, $C_5H_{11}$, $C_6H_{13}$, $C_7H_{15}$ or $C_5H_{17}$. In one implementation, in formula (I), R is H or $CH_3$, $R_1$, $R_2$, and $R_3$ may be identical or different and may each be, independently of one another, a linear or branched $C_1$ to $C_6$ alkyl group, such as $CH_3$, $C_2H_5$, $C_3H_7$, $C_4H_9$, $C_5H_{11}$, or $C_6H_{13}$. In one implementation, in formula (I), R is H or $CH_3$, $R_1$, $R_2$, and $R_3$ are each independently selected from $C_1$ to $C_2$ alkyl group, such as $CH_3$ and $C_2H_5$. In formula (I) $X^-$ may be one of $OH^-$, $CH_3COO^-$, $CF_3COO^-$, $CH_3SO_3^-$, or $CF_3SO_3^-$. In one implementation, in formula (I), R is H or $CH_3$, $R_1$, $R_2$, and $R_3$ are each independently selected from $C_1$ to $C_2$ alkyl group, such as $CH_3$ and $C_2H_5$. In one implementation, in formula (I), R is H, $R_1$ and $R_2$ are $CH_3$, $R_3$ is $CH_2CH_3$, and $X^-$ is $CH_3SO_3^-$. In another implementation, in formula (I), R is H, $R_1$, $R_2$ and $R_3$ are $CH_3$, and $X^-$ is $CH_3SO_3$.

In one implementation described herein, the curable resin precursor composition comprises a cationic monomer or positive zeta potential modifier of formula (II):

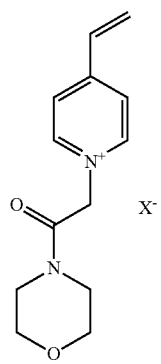

(II)

In formula (II), $X^-$ may be one of $OH^-$, $CH_3COO^-$, $CF_3COO^-$, $CH_3SO_3^-$, or $CF_3SO_3$.

The cationic monomers depicted in formula (I) and formula (II) may be prepared from their corresponding amines, with their corresponding alkyl halides, alkyl esters or alkyl sulfonates.

The cationic monomer of either formula (I) or formula (II) in the curable resin precursor composition may comprise at least 1 wt. %, 2 wt. %, 5 wt. %, 10 wt. %, 15 wt. %, 20 wt. %, or 25 wt. % based on the total weight of the curable resin precursor composition. The cationic monomer of either formula (I) or formula (II) in the curable resin precursor composition may comprise up to 2 wt. %, 5 wt. %, 10 wt. %, 15 wt. %, 20 wt. %, 25 wt. % or 30 wt. % based on the total weight of the curable resin precursor composition. The amount of the cationic monomer in the curable resin precursor composition may be from about 1 wt. % to about 30 wt. % based on the total weight of the curable resin precursor composition (e.g., from about 5 wt. % to about 20 wt. %; from about 5 wt. % to about 15 wt. %; or from about 10 wt. % to about 15 wt. % of the curable resin precursor composition).

In some implementations described herein, the pad-forming formulations include free-radically polymerizable olefinic and quaternary ammonium groups with sulfonate, sulfate, carboxylate, phosphonate, phosphinate or halides. In some implementations, the polymerizable olefinic groups include acrylate or acrylamide or their alkyl/aryl substituted moieties. In some implementations, the counter ions in the pad-forming formulation can have an alkyl chain length of between 1 and 8 carbon atoms, such as, for example, an alkyl chain length of 1 to 2 carbon atoms, and the alkyl groups is substituted with fluoro or alkyl groups.

In some implementations, the pad-forming formulation includes polar free-radically polymerizable monomers and oligomers. Some examples of the radically polymerizable monomers are N,N'-dimethylacrylamide, N,N'-diethylacrylamide, N,N'-dimethylmethacrylamide, t-Butylacrylamide, N-vinylpyrrolidinone, 2-hydroxyethyl acrylate, 2-hydroxyethyl methacrylate, vinyl imidazole, 2-vinylpyridine, 4-vinylpyridine and poly(ethylene glycol or propylene glycol) acrylates among others.

In some implementations, the sulfonate-containing monomers described herein are prepared by treating tertiary amine containing acrylate with sulfonate with or without solvent at various temperatures. After the reaction is complete, the solvent is removed to obtain the targeted sulfonate. One example is the reaction of dimethylaminoethyl acrylate with methyl methanesulfonate, ethyl methanesulfonate, hexyl methanesulfonate or trifluoroethyl methanesulfonate. Correspondingly, sulfates are prepared by the reaction of dimethylaminoethyl acrylate with dimethyl sulfate.

In some implementations, the pad-forming formulation includes oligomers of different kinds are added to adjust the overall properties of the final pad.

The pad-formulation further includes photoinitiators of various kinds, which are added by UV and UV-LED curing.

In some implementations, the pad-forming formulation further includes other additives to control the surface cure additives, print resolution increasing additives and the porosity formation.

In some implementations, use of the cationic monomers described herein forms a polishing pad having an average zeta potential of 0 to 100 mV in a pH range of 7 to 11.

The average zeta potential of at least one of the exposed surfaces or exposed regions of a surface of the polishing article formed with the cationic monomers described herein is more positive than the zeta potential of a polishing article formed without the zeta potential modifiers described herein. The average zeta potential of at least one of the exposed surfaces of the polishing article measured with the use of a neutral solution may range from about −40 mV to about +100 mV. The average zeta potential of at least one of the exposed surfaces of the polishing article measured with the use of a neutral solution may be at least −40 mV, −35 mV, −30 mV, −25 mV, −20 mV, −15 my, −10 my, −5 mV, 0 mV, 5 mV, 10, mV, 15 mV, 20 mV, 25 mV, 30 my, 35, mV, 40 mV, 45 mV, 50 mV, 55 mV, 60 my, 65, mV, 70 mV, 75 mV, 80 my, 85, mV, 90 mV, or 95 mV. The average zeta potential of at least one of the exposed surfaces of the polishing article measured with the use of a neutral solution may be at most −35 mV, −30 mV, −25 mV, −20 mV, −15 my, −10 my, −5 mV, 0 mV, 5 mV, 10, mV, 15 mV, 20 mV, 25 mV, 30 my, 35, mV, 40 mV, 45 mV, 50 mV, 55 mV, 60 my, 65, mV, 70 mV, 75 mV, 80 my, 85, mV, 90 mV, 95 mV, or 100 mV. In another implementation, the average zeta potential of at least one of the exposed surfaces of the polishing article measured with the use of a neutral solution may range from about 0 mV to about 100 mV (e.g., from about 5 mV to about 50 mV, from about 10 mV to about 40 mV, or from about 20 mV to about 30 mV).

The average measured zeta potential in some cases can be measured over a defined area of the polishing pad, such as a one cubic centimeter area of the surface of the polishing pad. In some implementations, regions of the polishing surface of the polishing pad are formed to have a different average zeta potential in each formed region. However, in some cases it may be desirable for the exposed pad surface to have a relatively constant average zeta potential across the exposed surface.

The following disclosure describes polishing articles and methods for manufacturing polishing articles. Certain details are set forth in the following description and in FIGS. 1-5 to provide a thorough understanding of various implementations of the disclosure. Other details describing well-known structures and systems often associated with polishing articles and methods of manufacturing polishing articles are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

It should be understood that although the polishing articles described herein are polishing pads, the implementations describe herein are also applicable to other polishing articles including, for example, buffing pads. Further, although the polishing articles described herein are discussed in relation to a chemical mechanical polishing process, the polishing articles and methods of manufacturing polishing articles described herein are also applicable to other polishing processes including polishing lenses and other processes including both abrasive and non-abrasive slurry systems. In addition, the polishing articles described herein may be used in at least the following industries: aerospace, ceramics, hard disk drive (HDD), MEMS and Nano-Tech, metalworking, optics and electro-optics, and semiconductor, among others.

In one implementation, an additive manufacturing process, such as a three dimensional printing (or 3-D printing) process may be used to produce (or make) the polishing articles described herein. In one implementation, a computer (CAD) model of the part is first made and then a slicing algorithm maps the information for every layer. In one non-limiting example of a 3-D printing process, droplets of a liquid precursor composition material are dispensed on a surface and are then cured to form the polishing article in layer-by-layer fashion, which is discussed further below. Since 3-D printing processes can exercise local control over the material composition, microstructure and surface texture, various (and previously inaccessible) geometries may be achieved with this method.

In one implementation, a polishing article as described herein may be represented in a data structure readable by a computer rendering device or a computer display device. The computer-readable medium may contain a data structure that represents the polishing article. The data structure may be a computer file, and may contain information about the structures, materials, textures, physical properties, or other characteristics of one or more articles. The data structure may also contain code, such as computer executable code or device control code that engages selected functionality of a computer rendering device or a computer display device. The data structure may be stored on the computer-readable medium. The computer-readable medium may include a physical storage medium such as a magnetic memory, floppy disk, or any convenient physical storage medium. The physical storage medium may be readable by the computer system to render the article represented by the data structure on a computer screen or a physical rendering device, which may be an additive manufacturing device, such as a 3D printer.

Polishing Pad Apparatus and Polishing Methods:

The improved polishing pad designs disclosed herein can be used to perform a polishing process in many different types of polishing apparatus. In one example, which is not intended to limit the scope of the disclosure provided herein, the polishing pad may be used in a polishing station that is used to polish semiconductor substrates. FIG. 1 is a schematic sectional view of a polishing station 100 having a porous polishing pad 106 formed according to the implementations described herein. The polishing station 100 may be positioned within a larger chemical mechanical polishing (CMP) system that contains multiple polishing stations 100. The polishing station 100 includes a platen 102. The platen 102 may rotate about a central axis 104. The porous polishing pad 106 may be placed on the platen 102. While not intending to limit the disclosure provided herein, typically, the porous polishing pad 106 covers an upper surface 103 of the platen 102 which is at least one to two times larger than the size of a substrate 110 (e.g., substrate diameter) that is to be processed in the polishing station 100. In one example, the porous polishing pad 106 and platen 102 are between about 6 inches (150 millimeters) and about 40 inches (1,016 millimeters) in diameter. The porous polishing pad 106 includes a polishing surface 112 configured to contact and process one or more substrates 110. The platen 102 supports the porous polishing pad 106 and rotates the porous polishing pad 106 during polishing. A carrier head 108 may hold the substrate 110 being processed against the polishing surface 112 of the porous polishing pad 106. A polishing interface 130 is formed between the polishing surface 112 and the substrate 110. The carrier head 108 typically includes a flexible diaphragm 111 that is used to urge the substrate 110 against the porous polishing pad 106 and a carrier ring 109 that is used to correct for an inherently non-uniform pressure distribution found across the substrate's surface during the polishing process. The carrier head 108 may rotate about a central axis 114 and/or move in a sweeping motion to generate relative motions between the substrate 110 and the porous polishing pad 106.

During polishing, a polishing fluid 116, such as an abrasive slurry or non-abrasive slurry, may be supplied to the polishing surface 112 by a delivery arm 118. The polishing fluid 116 may contain abrasive particles, a pH adjuster and/or chemically active components to enable chemical mechanical polishing of the substrate. The slurry chemistry of 116 is designed to polish substrate surfaces and/or features that may include metals, metal oxides, and semimetal oxides. One will note that the surface topography of the porous polishing pad 106 is used to control the transport of the polishing fluid 116 (e.g., slurry) which interacts with the substrate 110 during the polishing process. For example, the surface topology of the porous polishing pad 106 may include grooves, channels and other protuberances, which are formed by casting, molding, or machining, which may be disposed over, upon and within the porous polishing pad 106.

In some implementations, the polishing station 100 includes a pad conditioning assembly 120 that includes a conditioning arm 122 and actuators 124 and 126. The actuators 124 and 126 are configured to cause a pad conditioning disk 128 (e.g., diamond impregnated disk) to be urged against and sweep across the polishing surface 112 at different times during the polishing process cycle to abrade and rejuvenate the polishing surface 112 of the porous polishing pad 106. During processing, moving the porous polishing pad 106 and the carrier head 108 applies mechanical energy to the substrate 110, which in combination with the chemicals and abrasive components in the polishing fluid 116 will cause the surface of the substrate to become planarized.

Polishing Pad Configuration Examples

Examples of various structural configurations of polishing pads that can be used in a polishing apparatus are discussed in conjunction with FIGS. 2A-2K. The polishing pads illustrated in FIGS. 2A-2K may be used, for example, in the polishing station 100 depicted in FIG. 1. Unless otherwise specified, the terms first polishing element(s) 204 and the second polishing element(s) 206 broadly describe portions, regions and/or features within the polishing body of a polishing pad 200. In some configurations, the polishing pad 200 may contain pores or a material that will form a void in the surface of the pad once it is exposed to a slurry. The specific examples of different polishing pad configurations, shown in FIGS. 2A-2K, are not intended to be limiting as to the scope of the disclosure provided herein, since other similar configurations may be formed by use of the one or more of the additive manufacturing processes described herein.

The polishing pads may be formed by a layer-by-layer automated sequential deposition of at least one resin precursor composition followed by at least one curing process, wherein each layer may represent at least one polymer composition, and/or regions of different compositions. The curable resin precursor composition includes precursors, or resin precursor compositions, that contain "resin precursor components" that include, but are not restricted to functional polymers, functional oligomers, monomers, reactive diluents, flow additives, curing agents, photoinitiators, porosity forming agents, cationic surfactants and cure synergists wherein the cationic surfactant has an ionic charge (e.g., cationic), which makes the zeta potential of the polishing article more positive by co-polymerization with the prepolymer components of the curable resin precursor composition. The functional polymers may include multifunctional acrylate precursor components. To form a plurality of solid polymeric layers, one or more curing processes may be used, such as exposure of one or more compositions to UV radiation and/or thermal energy. In this fashion, an entire polishing pad may be formed from a plurality of polymeric layers by an additive manufacturing process. A thickness of the cured layer may be from about 0.1 micron to about 1 mm, such as 5 microns to about 100 microns, and such as 25 microns to about 30 microns.

The porous polishing pads configurations may have differing porosity across a pad body 202, as reflected by at least one compositional gradient from polishing element to polishing element. Porosity across the porous polishing pad may be symmetric or non-symmetric, uniform or non-uniform to achieve target polishing pad properties, which may include static mechanical properties, dynamic mechanical properties and wear properties. In one implementation, the pores form near the interface of each adjacent deposited layer.

The patterns of either of the polishing element(s) 204, 206 across the pad body 202 may be radial, concentric, rectangular, spiral, fractal or random according to achieve target properties including porosity, across the porous polishing pad. Advantageously, the 3D printing process enables specific placement of material compositions with targeted properties in specific areas of the pad, or over larger areas of the pad, so the properties can be combined and represent a greater average of properties or a "composite" of the properties.

Figure 2A:
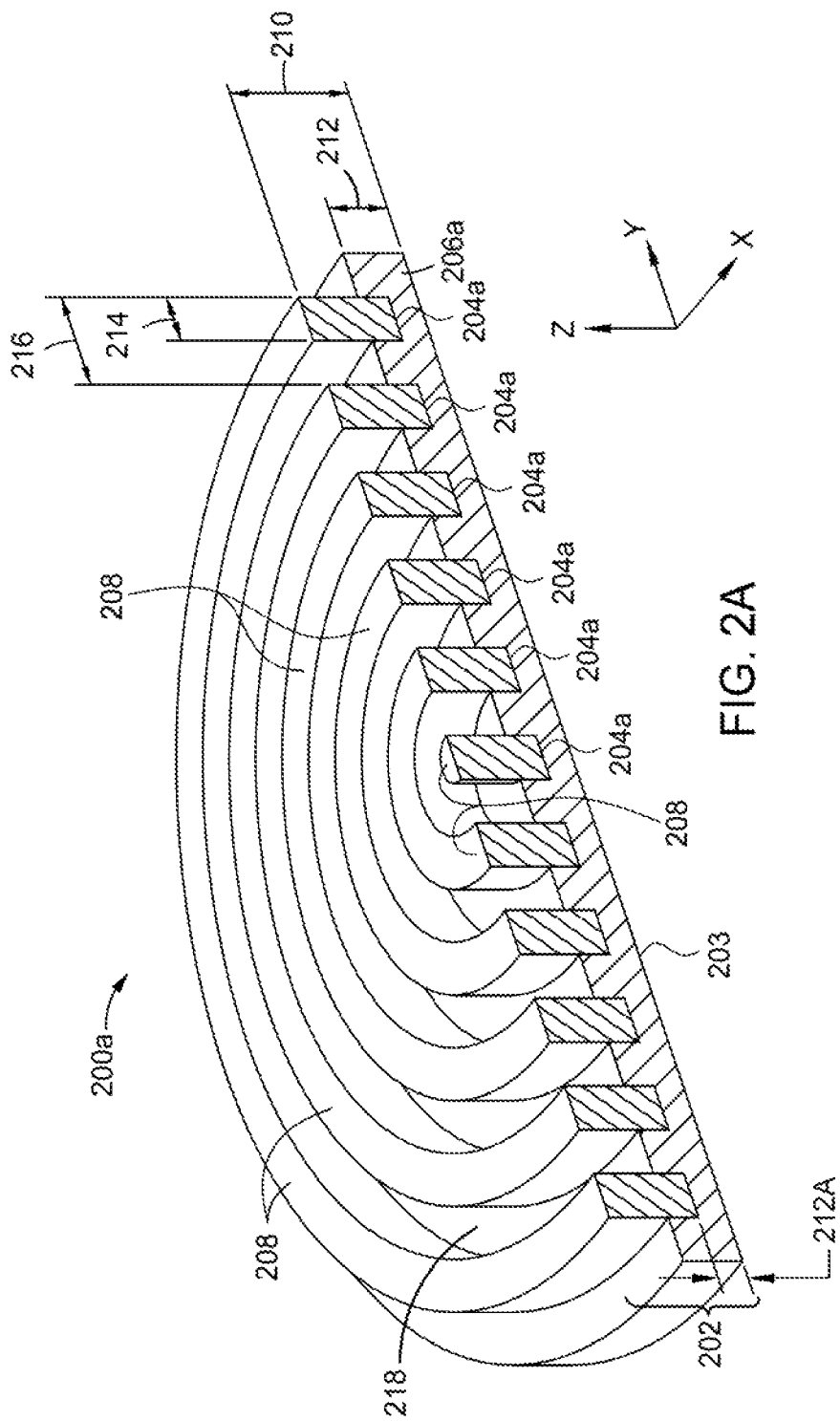
FIG. 2A is a schematic isometric and cross-sectional view of a polishing pad having increased hydrophilicity and a more positive zeta potential according to one or more implementations of the present disclosure.

FIG. 2A is a schematic perspective sectional view of a polishing pad 200a formed according to one implementation of the present disclosure. One or more first polishing element(s) 204a may formed in alternating concentric rings that are coupled to one or more second polishing element(s) 206a to form a pad body 202 that is circular. At least one of the one or more first polishing element(s) 204a and the one or more second polishing element(s) 206a may be formed according to the implementations described herein. In one implementation, a height 210 of the first polishing element(s) 204a from a supporting surface 203 is higher than a height 212 of the second polishing element(s) 206a so that the upper surface(s) 208 of the first polishing element(s) 204a protrude above the second polishing element(s) 206a. In one implementation, the first polishing element(s) 204 is disposed over a portion 212A of the second polishing element(s) 206a. Grooves 218 or channels are formed between the first polishing element(s) 204a, and at least include a portion of the second polishing element(s) 206a. During polishing, the upper surface(s) 208 of the first polishing element(s) 204a form a polishing surface that contacts the substrate, while the grooves 218 retain and channel the polishing fluid. In one implementation, the first polishing element(s) 204a are thicker than the second polishing element(s) 206a in a direction normal to a plane parallel to the polishing surface, or upper surface(s) 208, of the pad body 202 (i.e., Z-direction in FIG. 2A) so that the channels or grooves 218 are formed on the top surface of the pad body 202.

In one implementation, a width 214 of the first polishing element(s) 204a may be between about 250 microns and about 5 millimeters. The pitch 216 between the first polishing element(s) 204a may be between about 0.5 millimeters and about 5 millimeters. Each first polishing element(s) 204a may have a width within a range between about 250 microns and about 2 millimeters. The width 214 and/or the pitch 216 may vary across a radius of the polishing pad 200 to define zones of varied hardness, porosity, hydrophilicity, zeta potential and/or combinations thereof.

Figure 2B:
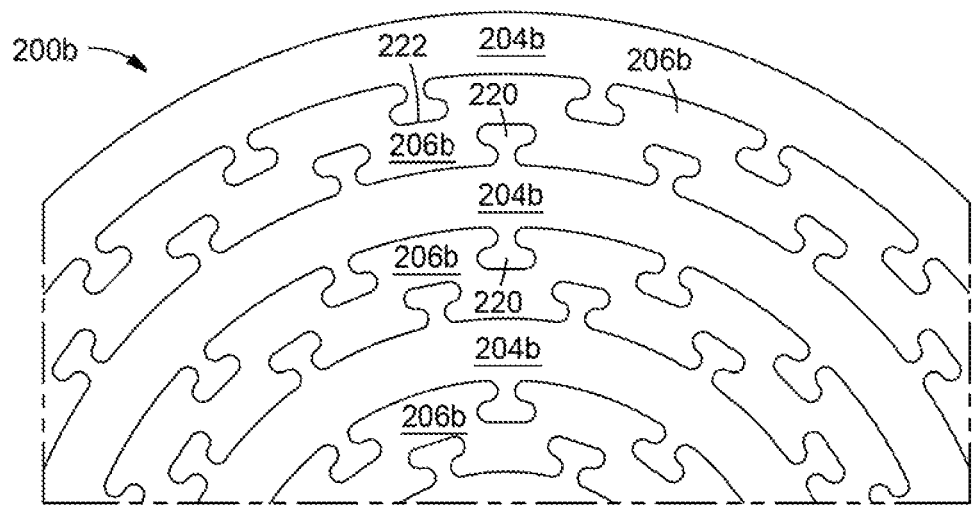
FIG. 2B is a schematic partial top view of a polishing pad according to one or more implementations of the present disclosure.

FIG. 2B is a schematic partial top view of a polishing pad 200b according to an implementation of the present disclosure. The polishing pad 200b is similar to the polishing pad 200 of FIG. 2A except that the polishing pad 200b includes interlocking first polishing element(s) 204b and second polishing element(s) 206b. At least one of the interlocking first polishing element(s) 204b and the second polishing element(s) 206b may be formed according to the implementations described herein. The interlocking first polishing element(s) 204b and the second polishing element(s) 206b form a plurality of concentric rings. The interlocking first polishing element(s) 204b may include protruding vertical ridges 220 and the second polishing element(s) 206b may include vertical recesses 222 for receiving the vertical ridges 220. Alternatively, the second polishing element(s) 206b may include protruding ridges while the interlocking first polishing element(s) 204b include recesses. By having the second polishing element(s) 206b interlock with the interlocking first polishing element(s) 204b, the polishing pad 200b will be mechanically stronger in relation to applied shear forces, which may be generated during the CMP process and/or material handling. In one implementation, the interlocking first polishing element(s) 204b and the second polishing element(s) 206b may be interlocked to improve the strength of the polishing pad and improve physical integrity of the polishing pads. The interlocking of the features may be due to physical and/or chemical forces.

Figure 2C:
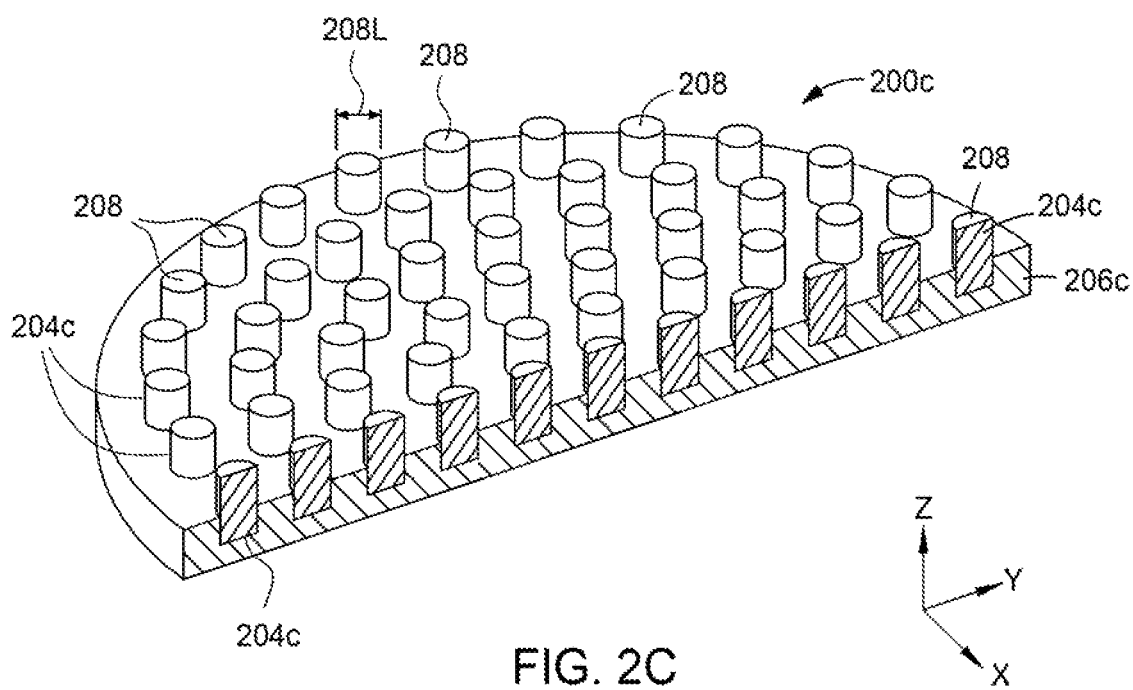
FIG. 2C is a schematic isometric and cross-sectional view of a polishing pad according to one or more implementations of the present disclosure.

FIG. 2C is a schematic perspective sectional view of a polishing pad 200c according to an implementation of the present disclosure. The polishing pad 200c includes a plurality of first polishing element(s) 204c extending from a base material layer, such as a second polishing element 206c. At least one of the one the plurality of first polishing element(s) 204c and the second polishing element 206c may be formed according to the implementations described herein. Upper surface(s) 208 of the first polishing element(s) 204c form a polishing surface for contacting the substrate during polishing. In one implementation, the first polishing element(s) 204c and the second polishing element 206c have different material and structural properties. In one example, the first polishing element(s) 204c may be formed from a first material having a more positive zeta potential, while the second polishing element 206c may be formed from a second material having a more negative zeta potential. Additionally, in another example, the first polishing element(s) 204c may be formed from a porous material having a more positive zeta potential, while the second polishing element 206c may be formed from a non-porous material having a more negative zeta potential. The polishing pad 200c may be formed by 3D printing, similar to the polishing pad 200.

The first polishing element(s) 204c may be substantially the same size, or may vary in size to create varied mechanical properties, such as porosity, across the polishing pad 200c. The first polishing element(s) 204c may be uniformly distributed across the polishing pad 200c, or may be arranged in a non-uniform pattern to achieve target properties in the polishing pad 200c.

In FIG. 2C, the first polishing element(s) 204c are shown to be circular columns extending from the second polishing element 206c and having a diameter 208L. Alternatively, the first polishing element(s) 204c may be of any suitable cross-sectional shape, for example columns with toroidal, partial toroidal (e.g., arc), oval, square, rectangular, triangular, polygonal, or other irregular section shapes, or combinations thereof. In one implementation, the first polishing element(s) 204c may be of different cross-sectional shapes to tune hardness, mechanical strength or other desirable properties of the polishing pad 200c.

Figure 2D:
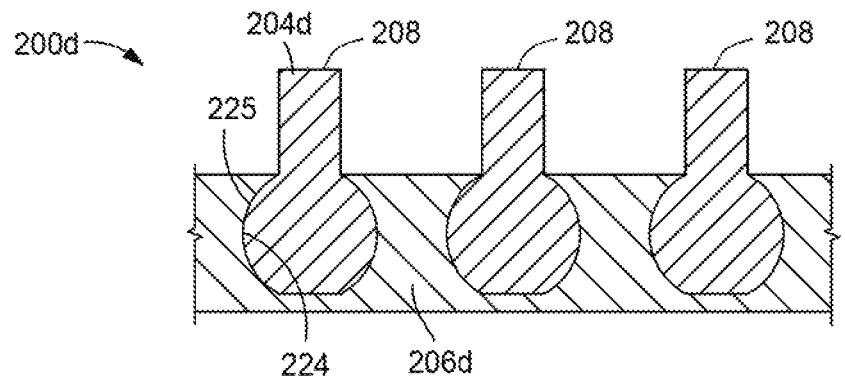
FIG. 2D is a schematic side cross-sectional view of a portion of a polishing pad according to one or more implementations of the present disclosure.

FIG. 2D is a schematic partial side cross-sectional view of a pad body 202 of a polishing pad 200d according to an implementation of the present disclosure. The polishing pad 200d is similar to the polishing pad 200a, 200b or 200c of FIGS. 2A-2C except that the polishing pad 200d includes interlocking first polishing element(s) 204d and second polishing element 206d. At least one of the one the plurality of interlocking first polishing element(s) 204d and the second polishing element 206d may have increased hydrophilicity and/or more positive zeta potential according to one or more implementations described herein. The interlocking first polishing element(s) 204d and the second polishing element 206d may include a plurality of concentric rings and/or discrete element(s) that form part of the pad body 202, which are illustrated, for example, in FIG. 2A, 2B or 2C. In one implementation, the interlocking first polishing element(s) 204d may include protruding sidewalls 224 while the second polishing element 206d may include regions 225 to receive the protruding sidewalls 224 of the interlocking first polishing element(s) 204d. Alternatively, the second polishing element 206d may include protruding sidewalls while the interlocking first polishing element(s) 204d include regions that are configured to receive the protruding sidewalls. By interlocking the second polishing element 206c with the interlocking first polishing element(s) 204d, the polishing pad 200d may exhibit an increased tensile, compressive and/or shear strength. Additionally, the interlocking sidewalls prevent the polishing pad 200d from being pulled apart.

In one implementation, the boundaries between the interlocking first polishing element(s) 204d and second polishing element 206d include a cohesive transition from at least one composition of material to another, such as a transition or compositional gradient from a first composition used to form the interlocking first polishing element(s) 204d and a second composition used to form the second polishing element 206d. The cohesiveness of the materials is a result of the additive manufacturing process described herein, which enables micron scale control and intimate mixing of the two or more chemical compositions in a layer-by-layer additively formed structure.

Figure 2E:
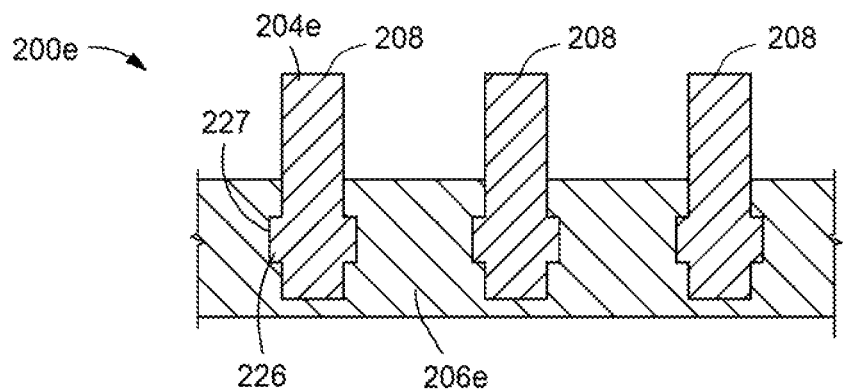
FIG. 2E is a schematic side cross-sectional view of a portion of a polishing pad according to one or more implementations of the present disclosure.
Figure 2F:
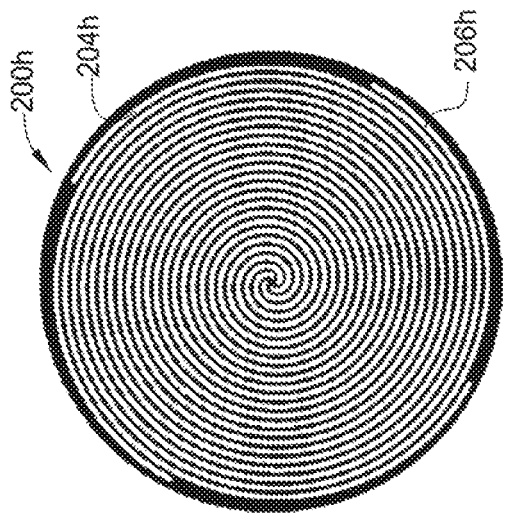
FIGS. 2F-2K are top views of polishing pad designs according to one or more implementations of the present disclosure.
Figure 2G:
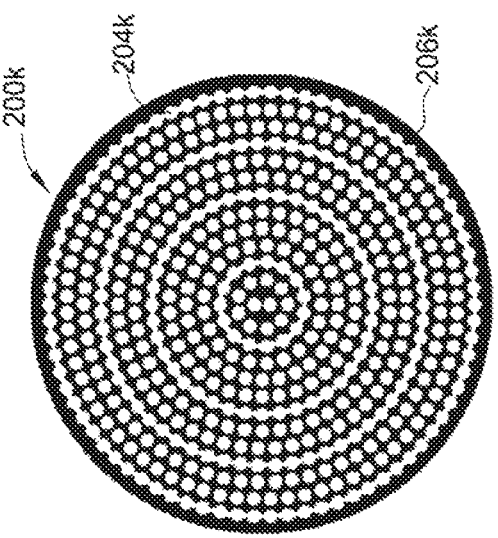
Figure 2H:
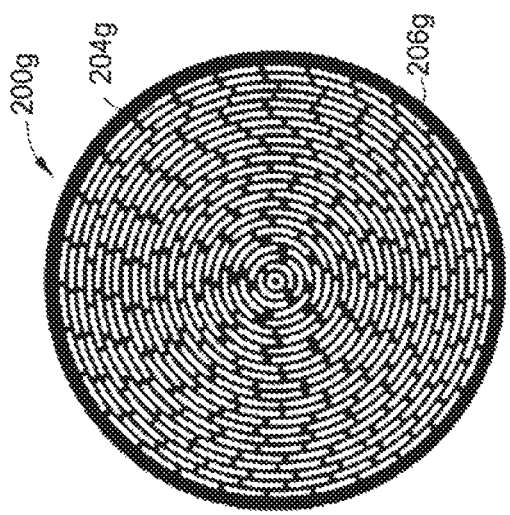
Figure 2I:
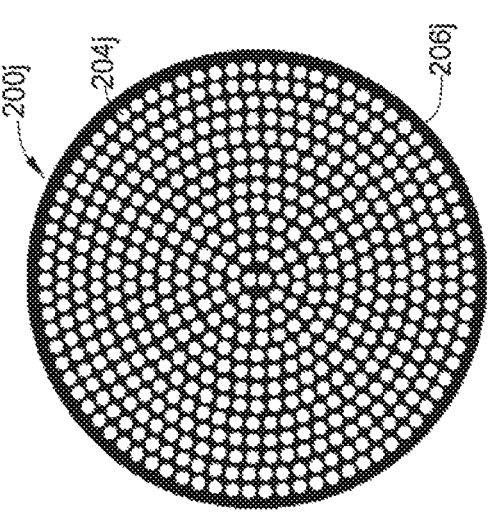
Figure 2J:
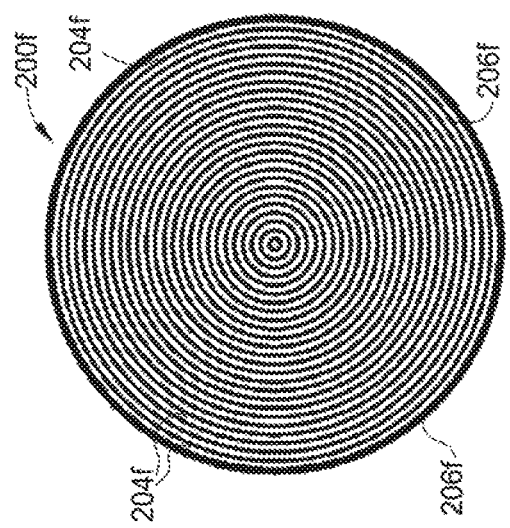
Figure 2K:
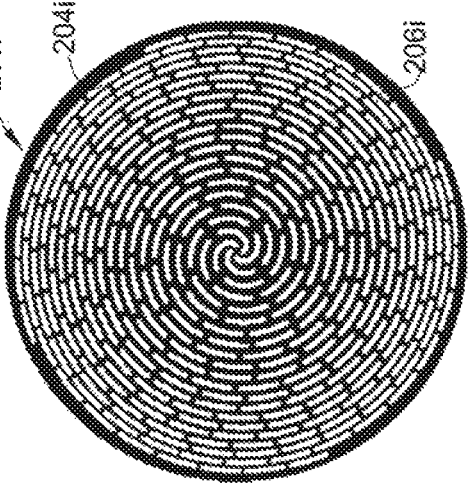

FIG. 2E is a schematic partial sectional view of a polishing pad 200e according to one or more implementations of the present disclosure. The polishing pad 200e is similar to the polishing pad 200d of FIG. 2D except that the polishing pad 200e includes differently configured interlocking features. The polishing pad 200e may include first polishing element(s) 204e and second polishing element(s) 206e having a plurality of concentric rings and/or discrete element(s). At least one of the one the first polishing element(s) 204e and the second polishing element(s) 206e may be porous and formed according to one or more implementations described herein. In one implementation, the first polishing element(s) 204e may include horizontal ridges 226 while the second polishing element(s) 206e may include horizontal recesses 227 to receive the horizontal ridges 226 of the first polishing element(s) 204e. Alternatively, the second polishing element(s) 206e may include horizontal ridges while the first polishing element(s) 204e include horizontal recesses. In one implementation, vertical interlocking features, such as the interlocking features of FIG. 2B and horizontal interlocking features, such as the interlocking features of FIGS. 2D and 2E, may be combined to form a polishing pad.

FIGS. 2F-2K are schematic plan views of various polishing pad designs according to implementations of the present disclosure. Each of FIGS. 2F-2K include pixel charts having white regions (regions in white pixels) that represent the first polishing element(s) 204f-204k, respectively, for contacting and polishing a substrate, and black regions (regions in black pixels) that represent the second polishing element(s) 206f-206k. As similarly discussed herein, the white regions generally protrude over the black regions so that channels are formed in the black regions between the white regions. In one example, the pixels in a pixel chart are arranged in a rectangular array type pattern (e.g., X and Y oriented array) that are used to define the position of the various materials within a layer, or a portion of layer, of a polishing pad. In another example, the pixels in a pixel chart are arranged in a hexagonal close pack array type of pattern (e.g., one pixel surrounded by six nearest neighbors) that are used to define the position of the various materials within a layer, or a portion of layer of a polishing pad. Polishing slurry may flow through and be retained in the channels during polishing. The polishing pads shown in FIGS. 2F-2K may be formed by depositing a plurality of layers of materials using an additive manufacturing process. Each of the plurality of layers may include two or more materials to form the first polishing element(s) 204f-204k and second polishing element(s) 206f-206k. In one implementation, the first polishing element(s) 204f-204k may be thicker than the second polishing element(s) 206f-206k in a direction normal to a plane that is parallel to the plurality of layers of materials so that grooves and/or channels are formed on a top surface of the polishing pad.

The first polishing element(s) 204a-204k in the polishing pads 200a-200k of FIGS. 2A-2K may be formed from an identical material or identical compositions of materials. Alternatively, the material composition and/or material properties of the first polishing element(s) 204a-204k in the designs of FIG. 2A-2K may vary from polishing feature to polishing feature. Individualized material composition and/or material properties allow tailoring of the polishing pads for specific needs.

It has been found that the structural configuration of the first polishing element(s) 204 relative to the second polishing element(s) 206 can also be used to control polishing process repeatability and improve the polishing rate of a polishing process. One such structural configuration relates to the relative physical layout of the first polishing element(s) 204 to the second polishing element(s) 206 in a formed advanced polishing pad, and is known herein as the total exposed surface area to volume ratio (SAVR) of the first polishing element(s) 204 within a formed advanced polishing pad. It is believed that by adjusting the total exposed surface area to volume ratio by controlling the relative physical layout of the first polishing element(s) 204 relative to the second polishing element(s) 206 and the mechanical properties (e.g., thermal conductivity, hardness, loss modulus, polishing contact area, etc.) of the materials used to form the first polishing element(s) 204 and/or the second polishing element(s) 206, the polishing process repeatability and substrate polishing rate can, along with other polishing parameter, be greatly improved. In one example, the mechanical properties of the material(s) within the first polishing element(s) 204 include a thermal diffusivity ($m^2/s$) that is less than about $6.0\times10^{-6}$, such as between about $1.0\times10^{-7}$ and $6.0\times10^{-6}$ $m^2/s$.

Formulation and Material Examples

As discussed above, the materials used to form portions of the pad body 202, such as the first polishing element(s) 204 and second polishing element(s) 206 may each be formed from at least one ink jettable pre-polymer composition that may be a mixture of functional polymers, functional oligomers, reactive diluents, flow additives, curing agents, photoinitiators, porosity forming agents, cationic monomers and cure synergists to achieve the targeted properties of an advanced polishing pad. In general, the pre-polymer inks or compositions may be processed after being deposited by use of any number of means including exposure or contact with radiation or thermal energy, with or without a curing agent or chemical initiator. In general, the deposited material can be exposed to electromagnetic radiation, which may include ultraviolet radiation (UV), gamma radiation, X-ray radiation, visible radiation, IR radiation, and microwave radiation. In addition, accelerated electrons and ion beams may be used to initiate polymerization reactions. For the purposes of this disclosure, the method of cure, or the use of additives to aid the polymerization, such as sensitizers, initiators, and/or curing agents, such as through cure agents or oxygen inhibitors is not restricted.

In one implementation, two or more polishing element(s), such as the first polishing element(s) 204 and the second polishing element(s) 206, within a unitary pad body, such as pad body 202, may be formed from the sequential deposition and post deposition processing of at least one radiation curable resin precursor composition, wherein the compositions contain functional polymers, functional oligomers, monomers, and/or reactive diluents that have unsaturated chemical moieties or groups, including but not restricted to: vinyl groups, acrylic groups, methacrylic groups, allyl groups, and acetylene groups. During the polishing pad formation process, the unsaturated groups may undergo free radical polymerization when exposed to radiation, such as UV radiation, in the presence of a curing agent, such as a free radical generating photoinitiator, such as an Irgacure® product manufactured by BASF of Ludwigshafen, Germany.

Two types of free radical photoinitiators may be used in one or more of the implementations of the disclosure provided herein. The first type of photoinitiator, which is also referred to herein as a bulk cure photoinitiator, is an initiator, which cleaves upon exposure to UV radiation, yielding a free radical immediately, which may initiate a polymerization. The first type of photoinitiator can be useful for both surface and through or bulk cure of the dispensed droplets. The first type of photoinitiator may be selected from the group including, but not restricted to benzoin ethers, benzyl ketals, acetyl phenones, alkyl phenones, and phosphine oxides. The second type of photoinitiator, which is also referred to herein as a surface cure photoinitiator, is a photoinitiator that is activated by UV radiation and forms free radicals by hydrogen abstraction from a second compound, which becomes the actual initiating free radical. This second compound is often called a co-initiator or polymerization synergist, and may be an amine synergist. Amine synergists are used to diminish oxygen inhibition, and therefore, the second type of photoinitiator may be useful for fast surface cure. The second type of photoinitiator may be selected from the group including but not restricted to benzophenone compounds and thioxanthone compounds. An amine synergist may be an amine with an active hydrogen, and in one implementation an amine synergist, such as an amine containing acrylate may be combined with a benzophenone photoinitiator in a resin precursor composition formulation to: a) limit oxygen inhibition, b) fast cure a droplet or layer surface so as to fix the dimensions of the droplet or layer surface, and c), increase layer stability through the curing process. In some implementations, to retard or prevent free radical quenching by diatomic oxygen, which slows or inhibits the free radical curing mechanism, one may choose a curing atmosphere or environment that is oxygen limited or free of oxygen. Environments that are oxygen limited or free of oxygen include an inert gas atmosphere, and chemical reagents that are dry, degassed and mostly free of oxygen.

It has been found that controlling the amount of the chemical initiator in the printed formulation is a factor in controlling the properties of a formed polishing pad, since the repeated exposure of underlying layers to the curing energy as the advanced polishing pad is formed will affect the properties of these underlying layers. In other words, the repeated exposure of the deposited layers to some amount of the curing energy (e.g., UV light, heat, etc.) will affect the degree of cure, or over curing the surface of that layer, within each of the formed layers. Therefore, in some implementations, it is desirable to ensure that the surface cure kinetics are not faster than through-cure (bulk-cure), as the surface will cure first and block additional UV light from reaching the material below the surface cured region; thus causing the overall partially cured structure to be "undercured." In some implementations, it is desirable to reduce the amount of photoinitiator to ensure proper chain extension and crosslinking. In general, higher molecular weight polymers will form with a slower controlled polymerization.

It is believed that if the reaction products contain too many radicals, reaction kinetics may proceed too quickly and molecular weights will be low which will in turn reduce mechanical properties of the cured material.

In some implementations, the first polishing element(s) and the second polishing element(s) 206 may contain at least one oligomeric and/or polymeric segments, compounds, or materials selected from polyamides, polycarbonates, polyesters, polyether ketones, polyethers, polyoxymethylenes, polyether sulfone, polyetherimides, polyimides, polyolefins, polysiloxanes, polysulfones, polyphenylenes, polyphenylene sulfides, polyurethanes, polystyrene, polyacrylonitriles, polyacrylates, polymethylmethacrylates, polyurethane acrylates, polyester acrylates, polyether acrylates, epoxy acrylates, polycarbonates, polyesters, melamines, polysulfones, polyvinyl materials, acrylonitrile butadiene styrene (ABS), halogenated polymers, block copolymers and copolymers thereof. Production and synthesis of the compositions used to form the first polishing element(s) 204 and second polishing element(s) 206 may be achieved using at least one UV radiation curable functional and reactive oligomer with at least one of the aforementioned polymeric and/or molecular segments, such as that shown in chemical structure A:

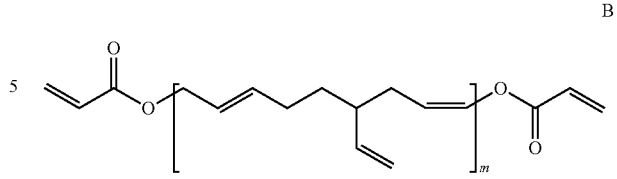

Polybutadiene diacrylate includes pendant allylic functionality (shown), which may undergo a crosslinking reaction with other unreacted sites of unsaturation. In some implementations, the residual double bonds in the polybutadiene segment "m" are reacted to create crosslinks, which may lead to reversible elastomeric properties. In one implementation, a polishing pad containing compositional crosslinks may have a percent elongation from about 5% to about 40%, and a E'30:E'90 ratio of about 6 to about 15. Examples of some crosslinking chemistries include sulfur vulcanization and peroxide, such as tert-butyl perbenzoate, dicumyl peroxide, benzoyl peroxide, di-tert-butyl peroxide and the like. In one implementation, 3% benzoyl peroxide, by total

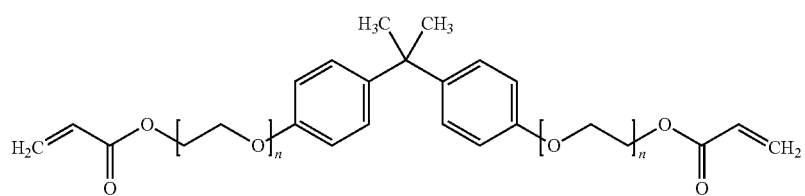

The difunctional oligomer as represented in chemical structure A, bisphenol-A ethoxylate diacrylate, contains segments that may contribute to the low, medium, and high storage modulus E' character of materials found in the first polishing element(s) 204 and second polishing element(s) 206 in the pad body 202. For example, the aromatic groups may impart added stiffness to the pad body 202 because of some local rigidity imparted by the phenyl rings. However, those skilled in the art will recognize that by increasing the ether chain segment "n" will lower the storage modulus E' and thus produce a softer material with increased flexibility. In one implementation, a rubber-like reactive oligomer, polybutadiene diacrylate, may be used to create a softer and more elastic composition with some rubber-like elastic elongation as shown in chemical structure B:

formulation weight, is reacted with polybutadiene diacrylate to form crosslinks such that the crosslink density is at least about 2%.

Chemical structure C represents another type of reactive oligomer, a polyurethane acrylate, a material that may impart flexibility and elongation to the polishing pad. An acrylate that contains urethane groups may be an aliphatic or an aromatic polyurethane acrylate, and the R or R' groups shown in the structure may be aliphatic, aromatic, oligomeric, and may contain heteroatoms such as oxygen.

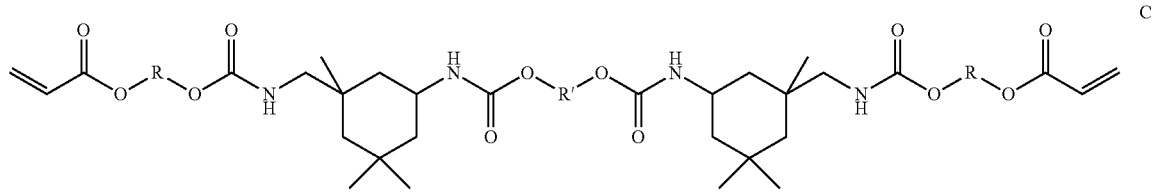

Reactive oligomers may contain at least one reactive site, such as an acrylic site, and may be monofunctional, difunctional, trifunctional, tetrafunctional, pentafunctional and/or hexafunctional and therefore serve as foci for crosslinking. Functional oligomers may be obtained from a variety of sources including Sartomer USA of Exton, Pa., Dymax Corporation of Torrington, Conn., USA, and Allnex Corporation of Alpharetta, Ga., USA.

In some implementations of the present disclosure, multifunctional acrylates, including di-, tri-, tetra-, and higher functionality acrylates, may be used to create crosslinks within the material used to form, and/or between the materials found in, the first polishing element(s) 204 and second polishing element(s) 206, and thus adjust polishing pad properties including storage modulus E', viscous dampening, rebound, compression, elasticity, elongation, and the glass transition temperature. It has been found that by controlling the degree of crosslinking within the various materials used to form the first polishing element(s) 204 and the second polishing element(s) 206 desirable pad properties can be formed. In some configurations, multifunctional acrylates may be advantageously used in lieu of rigid aromatics in the pad-forming formulation, because the low viscosity family of materials provides a greater variety of molecular architectures, such as linear, branched, and/or cyclic, as well as a broader range of molecular weights, which in turn widens the formulation and process window. Some examples of multifunctional acrylates are shown in chemical structures D (1,3,5-triacryloylhexahydro-1,3,5-triazine), and E (trimethylolpropane triacrylate):

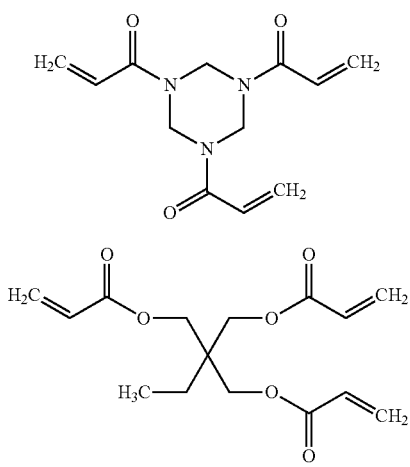

The type or crosslinking agent, chemical structure, or the mechanism(s) through which the crosslinks are formed are not restricted in the implementations of the present disclosure. For example, an amine-containing oligomer may undergo a Michael addition type reaction with acrylic moiety to form a covalent crosslink, or an amine group may react with an epoxide group to create a covalent crosslink. In other implementations, the crosslinks may be formed by ionic or hydrogen bonding. The crosslinking agent may contain linear, branched, or cyclic molecular segments and may further contain oligomeric and/or polymeric segments, and may contain heteroatoms such as nitrogen and oxygen. Crosslinking chemical compounds that may be useful for polishing pad compositions are available from a variety of sources including Sigma-Aldrich of St. Louis, Mo., USA, Sartomer USA of Exton, Pa., Dymax Corporation of Torrington, Conn., USA, and Allnex Corporation of Alpharetta, Ga., USA.

As mentioned herein, reactive diluents can be used as viscosity thinning solvents that are mixed with high viscosity functional oligomers to achieve the appropriate viscosity formulation, followed by copolymerization of the diluent(s) with the higher viscosity functional oligomers when exposed to a curing energy. In one implementation, when n is approximately equal to 4, the viscosity of bisphenol-A ethoxylate diacrylate may be about 1350 centipoise (cP) at 25° C., a viscosity which may be too high to effect dispense of a such a material in a 3D printing process. Therefore, it may be desirable to mix bisphenol-A ethoxylate diacrylate with a lower viscosity reactive diluents, such as low molecular weight acrylates, to lower the viscosity to about 1 cP to about 100 cP at 25 degrees Celsius, such as about 1 cP to about 20 cP at 25 degrees Celsius. The amount of reactive diluent used depends on the viscosity of the formulation components and the diluent(s) themselves. For example, a reactive oligomer of 1000 cP may involve at least 40% dilution by weight of formulation to achieve a target viscosity. Examples of reactive diluents are shown in chemical structures F (isobornyl acrylate), G (decyl acrylate), and H (glycidyl methacrylate):

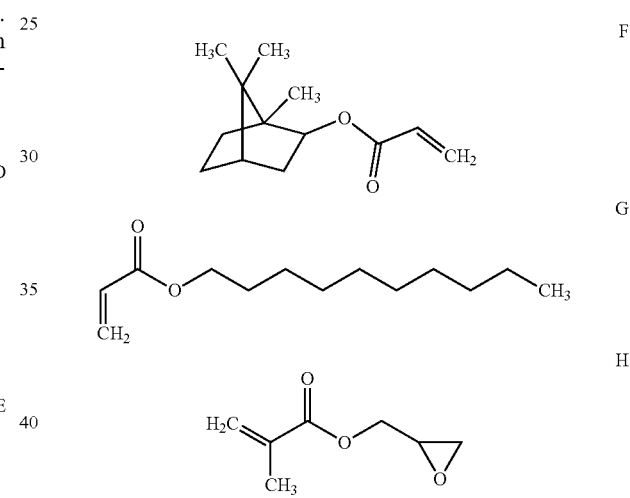

The respective viscosities of F-G at 25 degrees Celsius are 9.5 cP, 2.5 cP, and 2.7 cP, respectively. Reactive diluents may also be multifunctional, and therefore may undergo crosslinking reactions or other chemical reactions that create polymer diluent, and is mixed with a difunctional aliphatic urethane acrylates, so that the viscosity of the mixture is about 15 cP. The approximate dilution factor may be from about 2:1 to about 10:1, such as about 5:1. An amine acrylate may be added to this mixture, such as dimethylaminoethyl methacrylate, so that it is about 10% by weight of the formulation. Heating the mixture from about 25 degrees Celsius to about 75 degrees Celsius causes the reaction of the amine with the epoxide, and formation of the adduct of the acrylated amine and the acrylated epoxide. A suitable free radical photoinitiator, such as Irgacure® 651, may be then added at 2% by weight of formulation, and the mixture may be dispensed by a suitable 3D printer so that a 20-micron thick layer is formed on a substrate. The layer may then be cured by exposing the droplet or layer for between about 0.1 μs to about 15 seconds, such as about 10 seconds, to UV light from about 200 nm to about 400 nm using a scanning UV diode laser at an intensity of about 10 to about 50 mJ/cm² to create a thin polymer film. Reactive diluent chemical compounds that may be useful for 3D printed pad-forming formulations are available from a variety of sources including Sigma-Aldrich of St. Louis, Mo., USA, Sartomer USA of Exton, Pa., Dymax Corporation of Torrington, Ct., USA, and Allnex Corporation of Alpharetta, Ga., USA.

Another method of radiation cure that may be useful in the production of polishing pads is cationic cure, initiated by UV or low energy electron beam(s). Epoxy group containing materials may be cationically curable, wherein the ring opening polymerization of epoxy groups may be initiated by cations such as protons and Lewis acids. The epoxy materials may be monomers, oligomers or polymers, and may have aliphatic, aromatic, cycloaliphatic, arylaliphatic or heterocyclic structures. The epoxy materials can also include epoxide groups as side groups or groups that form part of an alicyclic or heterocyclic ring system.

UV-initiated cationic photopolymerization exhibits several advantages compared to the free-radical photopolymerization including lower shrinkage, better clarity, better through cure via living polymerization, and the lack of oxygen inhibition. UV cationic polymerization may polymerize classes of monomers, which cannot be polymerized by free radical means, such as epoxides, vinyl ethers, propenyl ethers, siloxanes, oxetanes, cyclic acetals and formals, cyclic sulfides, lactones and lactams. The cationically polymerizable monomers include both unsaturated monomers, such as glycidyl methacrylate (chemical structure H) that may also undergo free-radical polymerization through the carbon-carbon double bonds as described herein. Photoinitiators that generate a photoacid when irradiated with UV light (~225 to 300 nm) or electron beams include, but are not limited to aryl onium salts, such as iodonium and sulfonium salts, such as triarylsulfonium hexafluorophosphate salts, which may be obtained from BASF of Ludwigshafen, Germany (Irgacure® product).

In one implementation, the material(s) used to form the first polishing element(s) 204 and the second polishing element(s) 206, and thus the pad body 202, may be formed from the sequential deposition and cationic cure of at least one radiation curable resin precursor composition, wherein the compositions contain functional polymers, functional oligomers, monomers, and/or reactive diluents that have epoxy groups. Mixed free radical and cationic cure systems may be used to save cost and balance physical properties. In one implementation, the first polishing element(s) 204 and the second polishing element(s) 206, may be formed from the sequential deposition and cationic and free radical cure of at least one radiation curable resin precursor composition, wherein the compositions contain functional polymers, functional oligomers, monomers, cationic monomers, reactive diluents that have acrylic groups and epoxy groups. In another implementation, to take advantage of the clarity and lack of light absorption inherent in some cationically cured systems, an observation window or CMP end-point detection window may be formed from a composition cured by the cationic method. In some implementations, some of the layers in the formed polishing pad may be formed by use of a cationic curing method and some of the layers may be formed from a free radical curing method.

In one implementation, the 3D printed polymer layers may contain inorganic and/or organic particles that are used to enhance one or more pad properties of selected material layers found in the formed advanced polishing pad 200. Because the 3D printing process involves layer-by-layer sequential deposition of at least one composition per layer, it may also be desirable to additionally deposit inorganic or organic particles disposed upon or within a pad layer to obtain a certain pad property and/or to perform a certain function. The inorganic or organic particles may be in the 25 nanometer (nm) to 100 micrometer (μm) range in size and may be added to the precursor materials prior to being dispensed by a droplet ejecting printer, such as the droplet ejecting printer 306 (See FIGS. 3A-3D) or added to an uncured printed layer in a ratio of between 1 and about 50 weight percent (wt. %). The inorganic or organic particles may be added during the polishing pad formation process to improve the ultimate tensile strength, improve yield strength, improve the stability of the storage modulus over a temperature range, improve heat transfer, adjust a surfaces zeta potential, and/or adjust a surface's surface energy. The particle type, chemical composition, or size, and the added particles may vary by application or targeted effect that is to be achieved. In some implementations, the particles may include intermetallic materials, ceramics, metals, polymers and/or metal oxides, such as ceria, alumina, silica, zirconia, nitrides, carbides, or combinations thereof. In one example, the inorganic or organic particles disposed upon, over or within a pad may include particles of high performance polymers, such PEEK, PEK, PPS, and other similar materials to improve the mechanical properties and/or thermal conductivity of the advanced polishing pad. The particles that are integrated in a 3D printed polishing pad may also serve as foci for crosslinking, which may lead to a higher storage modulus E' depending on a percent by weight loading. In another example, a polymer composition containing polar particles, such as ceria, may have a further affinity for polar materials and liquids at the pad surface, such as CMP slurries.

Advanced Polishing Pad Formulation Examples

Aspects of the implementations described herein are further illustrated by the following examples. The particular materials and amounts thereof, as well as other conditions and details, recited in these examples should not be used to limit the implementations described herein. Examples of the present disclosure are identified by the letter "E" followed by the sample number while comparative examples, which are not examples of the present disclosure are designated by the letter "X" followed by the sample number.

As noted above, in some implementations, one or more of the materials used to form at least one of the two or more polishing element(s), such as the first polishing element(s) 204 and the second polishing element(s) 206, is formed by sequentially depositing and post deposition processing of at least one curable resin precursor composition. In general, the curable resin precursor compositions, which are mixed during the precursor formulation process performed in a precursor delivery section 353 of an additive manufacturing system 350 (See FIG. 3A), will include the formulation of resin precursor compositions that contain functional oligomers, cationic monomers, reactive diluents and curing components, such as initiators. Examples of some of these components are listed below in Table 1.

TABLE 1

| Reference Name | Material Information | Functionality | Tg (° C.) | UTS (psi) | % Elongation |
|---|---|---|---|---|---|
| O1 | Aliphatic urethane acrylate oligomer | 2 | 27 | 5378 | 79 |
| O2 | Aliphatic hexafunctional urethane acrylate | 6 | 145 | 11,000 | 1 |
| O3 | Low viscosity diacrylate oligomer | 2 | 26 | 1,600 | 10 |
| O4 | Aliphatic hexafunctional acrylate | 6 | 120 | | |
| O5 | Multifunctional urethane acrylate oligomer | 3.4 | 46 | 3045 | 2 |
| M1 | Dipropylene glycol diacrylate | 2 | 104 | 2938 | 5 |
| M2 | 2-Propenoic acid, 2-phenoxyethyl ester | 1 | 5 | 19 | 236 |
| M3 | Tertio-butyl cyclohexanol acrylate (TBCHA) | 1 | 41 | | |
| M4 | Polyether-modified polydimethylsiloxane | | | | |
| M5 | CTFA 2 Ethers | 1 | 32 | — | — |
| M6 | EOEO-EA | 1 | −54 | — | — |
| M7 | Isobornyl Acrylate | 1 | 97 | | |
| M8 | Tetrahydrofurfuryl acrylate | | | | |
| P1 | 2-Hydroxy-2-methyl-1-phenyl-propan-1-one | | N/A | N/A | N/A |
| P2 | 4-Phenylbenzophenone | | N/A | N/A | N/A |
| A1 | Acrylated amine synergist | <1 | N/A | N/A | N/A |
| C1 | Cationic monomer of formula (I) | | | | |
| C2 | Cationic monomer of formula (II) | | | | |

Examples of functional oligomers can be found in items O1-O5 in Table 1. Examples of functional reactive diluents and other additives can be found in items M1-M8 in Table 1. Examples of curing components are found in items P1-P2 and A1 in Table 1. Examples of cationic monomers are found in C1-C2 of Table 1 and methods of making C1-C2 are described herein. Items O1-O3, M1-M3 and M5-M8 found in Table 1 are available from Sartomer USA, item O4 is available from Miwon Specialty Chemical Corporation, Ltd., of Korea, item O5 is available from Allnex Corporation of Alpharetta, Ga., USA, item M4 is available from BYK-Gardner GmbH of Germany and items P1-P2 and A1 are available from Chiba Specialty Chemicals Inc. and RAHN USA Corporation.

One advantage of the additive manufacturing processes described herein includes the ability to form an advanced polishing pad that has properties that can be adjusted based on the composition of the materials and structural configuration of the various materials used within the pad body structure. The information below provides some examples of some material formulations and the affect that varying various components in these formulations and/or processing techniques have on some of the properties needed to form an advanced polishing pad that will achieve improved polishing results over conventional polishing pad designs. The information provided in these examples can be used to form at least a portion of the advanced polishing pad 200, such as part of the first polishing element(s) 204, the second polishing element(s) 206, or both the first polishing element(s) 204 and the second polishing element(s) 206. The examples provided herein are not intended to be limiting as to the scope of the implementations provided herein, since other similar chemical formulations and processing techniques can be used to adjust some of the properties described herein.

Examples of the curable resin precursor composition components, which are described above and below, are intended to be comparative examples and one skilled in the art can find other suitable monomers/oligomers from various sources to achieve the targeted properties. Some examples for reactive diluents are 2-ethylhexyl acrylate, octyldecyl acrylate, cyclic trimethylolpropane formal acrylate, caprolactone acrylate and alkoxylated lauryl methacrylate. The first material is available from Sigma-Aldrich, and the balance may be obtained from Sartomer USA and/or RAHN AG USA (SR series 203, 217, 238, 242, 306, 339, 355, 368, 420, 484, 502, 506A, 508, SR 531, 550, 585, 495B, 256, 257, 285, 611, 506, 833S, and 9003B, CD series 421A, 535, 545, 553, 590, 730, and 9075, Genomer series 1116, 1117, 1119, 1121, 1122, 5142, 5161, 5275, 6058, 7151, and 7210, Genocure series, BP, PBZ, PMP, DETX, ITX, LBC, LBP, TPO, and TPO-L, and Miramer series, M120, M130, M140, M164, M166, and M170). Some examples for difunctional cross-linkers are bisphenol A glycerolate dimethacrylate, ethylene glycol dimethacrylate, diethylene glycol dimethacrylate, tetraethylene glycol dimethacrylate, 1,6-hexanediol diacrylate and 1,4-butanediol diacrylate, which may be obtained from Sigma-Aldrich. Some examples of oligomers could include aliphatic oligomers (CN series 131, 131B, 132, 152, 508, 549, 2910, 3100 and 3105 from Sartomer USA), polyester acrylate oligomers (CN series 292, 293, 294E, 299, 704, 2200, 2203, 2207, 2261, 2261LV, 2262, 2264, 2267, 2270, 2271E, 2273, 2279, 2282, 2283, 2285 and 2303 from Sartomer USA) and aliphatic urethane oligomers (CN series 929, 959, 961H81, 962, 969, 964A85, 965, 968, 980, 986, 989, 991, 992, 996, 2921, 9001, 9007, 9013, 9178 and 9783 from Sartomer USA). The agents or additives could be supplied from BYK, such as 3550, 3560, 307, 378, 1791, 1794, 9077, A515, A535, JET9510, JET9511, P9908, UV3500, UV3535, DISPERBYK®-168, and DISPERBYK®-2008. The first type photoinitiator could be from BASF, such as Irgacure series 184, 2022, 2100, 250, 270, 295, 369, 379, 500, 651, TPO, TPO-L, 754, 784, 819, 907, 1173, or 4265. Additionally, other functional oligomers and resin precursor composition components can be purchased from Allnex Corp., such as the Ebecryl series (EB): 40, 53, 80, 81, 83, 110, 114, 130, 140, 150, 152, 154, 168, 170, 180, 220, 230, 242, 246, 264, 265, 270, 271, 284, 303, 350, 411, 436, 438, 450, 452, 524, 571, 600, 605, 608, 657, 745, 809, 810, 811, 812, 830, 860, 870, 871, 885, 888, 889, 893, 1258, 1290, 1291, 1300, 1360, 1710, 3200, 3201, 3411, 3415, 3418, 3500, 3600, 3700, 3701, 3720, 4265, 4827, 4833, 4849, 4858, 4883, 5129, 7100, 8100, 8296, 8301, 8311, 8402, 8405, 8411, 8412, 8413, 8414, 8465, 8501, 8602, 8701, 8702, 8804, 8807, 8808, and 8810.

EXAMPLES

The following non-limiting examples are provided to further illustrate implementations described herein. However, the examples are not intended to be all-inclusive and are not intended to limit the scope of the implementations described herein. The zeta potential of the polishing surfaces of the polishing articles was measured using a SurPASS™ Electrokinetic Analyzer available from Anton Parr according to the streaming potential technique in which 1 mM of a KCl solution was used.

Example 1

Synthesis of Zp Additive of the Cationic Acrylic Monomer of Formula (I) Wherein R is H, $R_1$, $R_2$ and $R_3$ are $CH_3$, and $X=CF_3SO_3$ Methyl trifluoromethanesulfonate (10 g) was added to a 100-ml round bottom flask under nitrogen atmosphere. Chloroform (10 ml) was added to form a mixture. The mixture was cooled with ice water to 5 degrees Celsius. After cooling, 2-(Dimethylamino)ethyl acrylate (8.72 g) was added dropwise to the mixture. The reaction was stirred for 18 hours and the volatiles removed under reduced pressure to obtain the title compound.

Example 2

Synthesis of Zp Additive of the Cationic Acrylic Monomer of Formula (I) Wherein R is H, $R_1$ and $R_2$ are $CH_3$, $R_3$ is $CH_2CH_3$ and $X=CH_3SO_3$ 2-(Dimethylamino)ethyl acrylate (15.74 g) was added to a 100-ml round bottom flask under nitrogen atmosphere. The mixture was cooled with ice water to 5 degrees Celsius. Then ethyl methanesulfonate (13.65 g) was added dropwise. The reaction mixture was slowly warmed to 40 degrees Celsius and maintained at 40 degrees Celsius for 2 hours. Heating was stopped and the resulting solution was stirred overnight to obtain the title compound.

Example 3

Rigid Formulation (X1) Incorporating Zp Additive of Example 1

The high modulus formulation (X1) was prepared by mixing monomers and oligomers along with photoinitiators to have viscosity of 14.5 cP at 70 degrees Celsius as shown in Table 2.

TABLE 2

|    | O1 | O4 | M1 | P1 |
|----|------|------|------|------|
| X1 | ~20 wt % | ~40 wt % | ~40 wt % | ~2 wt % |

To the formulation X1, the cationic monomer of Example 1 was added in the amounts of 5% by weight (E1), 10% by weight (E2) and 15% by weight (E3). As shown in Table 3, the Zp of the cured product increased from −50 to −8 mV at pH 7 indicating that Zp value increasing towards the positive side with increased addition of the cationic monomer of Example 1.

TABLE 3

| ID | Cationic Additive in F1042% | UTS (MPa) | % El | E30 $1^{st}$ | E90 $1^{st}$ | E30 2nd | E90 $2^{nd}$ | E30/E90 ratio $1^{st}$ | E30/E90 ratio 2nd | Water CA (°) | Viscosity (cP at 70 C.) | Viscosity after stab test (cP at 70 C.) | Zp at pH 7 (mV) |
|----|----|----|----|----|----|----|----|----|----|----|----|----|----|
| X1 | 0 | 33 | 3.5 | 1354 | 236 | 959 | 250 | 6 | 4 | 80 | 14.3 | 14.6 | −50 |
| E1 | 5 | 29 | 3.9 | 1461 | 318 | 1134 | 338 | 4.6 | 3.4 | 76 | 15.5 | 15.2 | −22 |
| E2 | 10 | 38 | 5.4 | 1312 | 302 | 1115 | 328 | 4.3 | 3.4 | 75 | 17.1 | 16.9 | |
| E3 | 15 | 33 | 5.3 | 1318 | 238 | 1058 | 266 | 5.5 | 4.0 | 86 | 20.0 | 19.3 | −8 |

Example 4

Soft Formulation (X2) Incorporating Zp Additive of Example 2

This low modulus formulation was prepared by mixing monomers and oligomers along with photoinitiators to have viscosity of around 14 cP at 70 degrees Celsius. To this formulation, the second cationic monomer of Example 2 was added in the amounts of 10% by weight (E4) and 15% by weight (E5) was added by adjusting the oligomer and monomer content slightly to maintain viscosity around 14 cP at 70 degrees Celsius. As shown in Table 4, the Zp of the cured product increased from −40 (without Zp monomer) to +56.6 mV at pH 7 indicating that Zp is positive after adding the Zp monomer.

TABLE 4

Additive Manufacturing Apparatus and Process Examples

| ID | C2 | O1 | O4 | M7 | Viscosity cP @70 C. | Zp at pH 7 (mV) |
|---|---|---|---|---|---|---|
| E4 | 10 | 22.5 | 27.5 | 40 | 14.0 | 21.4 |
| E5 | 15 | 20.25 | 24.75 | 40 | 14.2 | 56.6 |

Figure 3A:
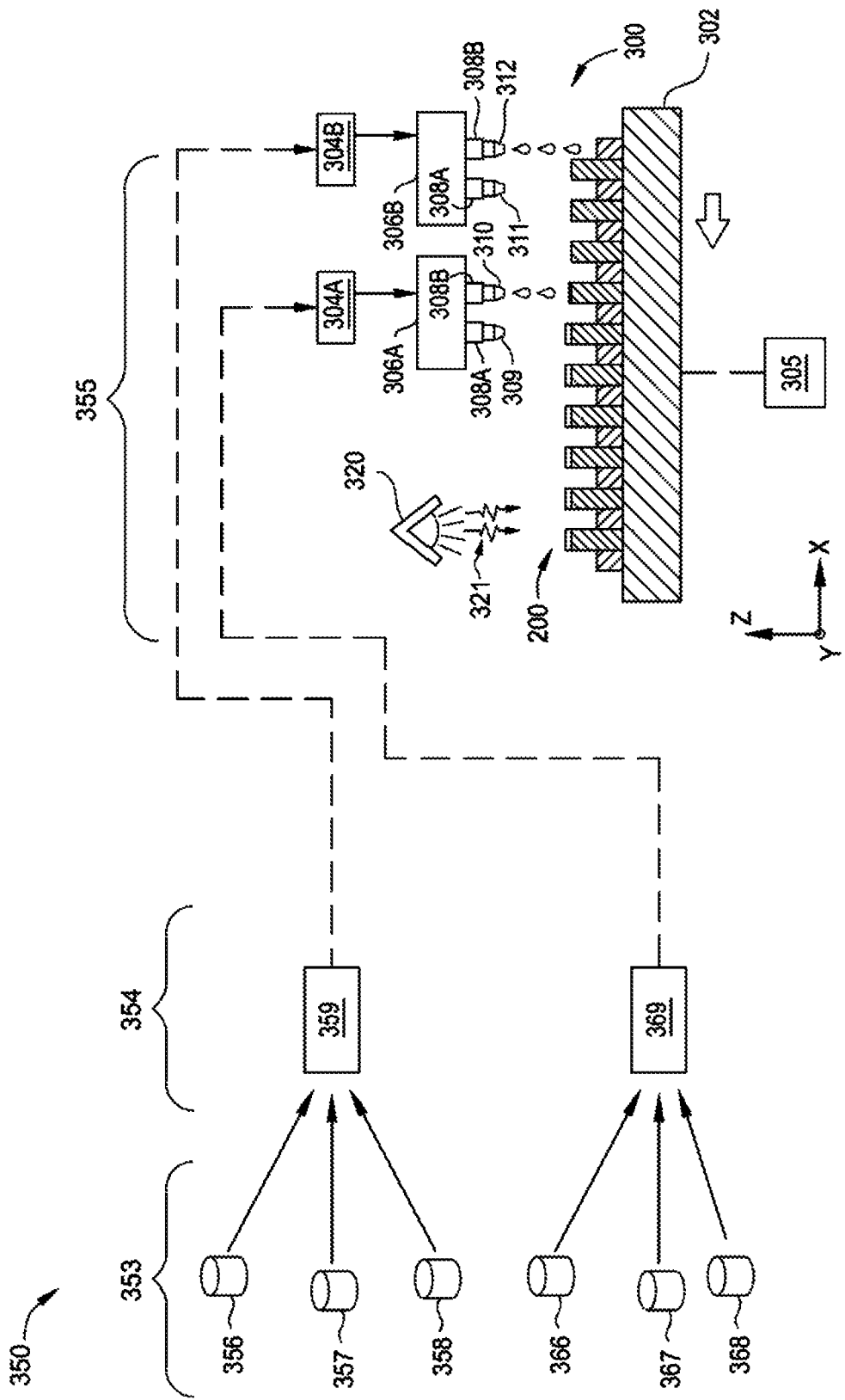
FIG. 3A is a schematic view of a system for manufacturing advanced polishing pads, according to one or more implementations of the present disclosure.

FIG. 3A is a schematic sectional view of an additive manufacturing system 350 that can be used to form an advanced polishing pad using an additive manufacturing process according to one or more implementations of the present disclosure. An additive manufacturing process may include, but are not limited to a process, such as a polyjet deposition process, inkjet printing process, fused deposition modeling process, binder jetting process, powder bed fusion process, selective laser sintering process, stereolithography process, vat photopolymerization digital light processing, sheet lamination process, directed energy deposition process, or other similar 3D deposition process.

The additive manufacturing system 350 generally includes a precursor delivery section 353, a precursor formulation section 354 and a deposition section 355. The deposition section 355 will generally include an additive manufacturing device, or hereafter printing station 300. The advanced polishing pad 200 may be printed on a support 302 within the printing station 300. Typically, the advanced polishing pad 200 is formed layer by layer using one or more droplet ejecting printers 306, such as printer 306A and printer 306B illustrated in FIG. 3A, from a CAD (computer-aided design) program. The printers 306A, 306B and the support 302 may move relative to each other during the printing process.

The droplet ejecting printer 306 may include one or more print heads 308 having one or more nozzles (e.g. nozzles 309-312) for dispensing liquid precursors. In the implementation of FIG. 3A, the droplet ejecting printer 306A includes print head 308A that has a nozzle 309 and a print head 308B having a nozzle 310. The nozzle 309 may be configured to dispense a first liquid precursor composition to form a first polymer material, such as a soft or low storage modulus E' polymer, while the nozzle 310 may be used to dispense a second liquid precursor to form a second polymer material, such as a hard polymer, or a polymer exhibiting a high storage modulus E'. The liquid precursor compositions may be dispensed at selected locations or regions to form an advanced polishing pad that has desirable properties. These selected locations collectively form the target printing pattern that can be stored as a CAD-compatible file that is then read by an electronic controller 305, which controls the delivery of the droplets from the nozzles of the droplet ejecting printer 306.

The electronic controller 305 is generally used to facilitate the control and automation of the components within the additive manufacturing system 350, including the printing station 300. The electronic controller 305 can be, for example, a computer, a programmable logic controller, or an embedded controller. The electronic controller 305 typically includes a central processing unit (CPU) (not shown), memory (not shown), and support circuits for inputs and outputs (I/O) (not shown). The CPU may be one of any form of computer processors that are used in industrial settings for controlling various system functions, substrate movement, chamber processes, and control support hardware (e.g., sensors, motors, heaters, etc.), and monitor the processes performed in the system. The memory is connected to the CPU, and may be one or more of a readily available non-volatile memory, such as random access memory (RAM), flash memory, read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the electronic controller 305 determines which tasks are performable by the components in the additive manufacturing system 350. Preferably, the program is software readable by the electronic controller 305 that includes code to perform tasks relating to monitoring, execution and control of the delivery and positioning of droplets delivered from the printer 306, and the movement, support, and/or positioning of the components within the printing station 300 along with the various process tasks and various sequences being performed in the electronic controller 305.

After 3D printing, the advanced polishing pad 200 may be solidified by use of a curing device 320 that is disposed within the deposition section 355 of the additive manufacturing system 350. The curing process performed by the curing device 320 may be performed by heating the printed polishing pad to a curing temperature or exposing the pad to one or more forms of electromagnetic radiation or electron beam curing. In one example, the curing process may be performed by exposing the printed polishing pad to radiation 321 generated by an electromagnetic radiation source, such as a visible light source, an ultraviolet light source, and x-ray source, or other type of electromagnetic wave source that is disposed within the curing device 320.

The additive manufacturing process offers a convenient and highly controllable process for producing advanced polishing pads with discrete features formed from different materials and/or different compositions of materials. In one implementation, soft or low storage modulus E' features and/or hard or high storage modulus E' features may be formed using the additive manufacturing process. For example, the soft or low storage modulus E' features of a polishing pad may be formed from the first composition containing polyurethane segments dispensed from the nozzle 312 of the printer 306B, and hard or high storage modulus E' features of the polishing pad may be formed from droplets of the second composition dispensed from the nozzle 310 of the printer 306A.

In another implementation, the first polishing element(s) 204 and/or the second polishing element(s) 206 may each be formed from a mixture of two or more compositions. In one example, a first composition may be dispensed in the form of droplets by a first print head, such as the print head 308A, and the second composition may be dispensed in the form of droplets by a second print head, such as the print head 308B of the printer 306A. To form first polishing element(s) 204 with a mixture of the droplets delivered from multiple print heads includes the alignment of the pixels corresponding to the first polishing element(s) 204 on predetermined pixels within a deposition map found in the electronic controller 305. The print head 308A may then align with the pixels corresponding to where the first polishing element(s) 204 are to be formed and then dispense droplets on the predetermined pixels. The advanced polishing pad may thus be formed from a first composition of materials that is formed by depositing droplets of a first droplet composition and a second material that comprises a second composition of materials that is formed by depositing droplets of a second droplet composition.

FIG. 3B is a schematic cross-sectional view of a portion of the printing station 300 and advanced polishing pad 200 during the pad manufacturing process. The printing station 300, as shown in FIG. 3B, includes two printers 306A and 306B that are used to sequentially form a portion of the advanced polishing pad 200. The portion of the advanced polishing pad 200 shown in FIG. 3B may, for example, include part of either the first polishing element(s) 204 or the second polishing element(s) 206 in the finally formed advanced polishing pad 200. During processing, the printers 306A and 306B are configured to deliver droplets "A" or "B," respectively, to a first surface of the support 302 and then successively to a surface of the growing polishing pad that is disposed on the support 302 in a layer-by-layer process. As shown in FIG. 3B, a second layer 348 is deposited over a first layer 346 which has been formed on the support 302. In one implementation, the second layer 348 is formed over the first layer 346, which has been processed by the curing device 320 that is disposed downstream from the printers 306A and 306B in the pad manufacturing process. In some implementations, portions of the second layer 348 may be simultaneously processed by the curing device 320 while one or more of the printers 306A and 306B are depositing droplets "A" and/or "B" onto the surface 346A of the previously formed layer 346. In this case, the layer that is currently being formed may include a processed portion 348A and an unprocessed portion 348B that are disposed on either side of a curing zone 349A. The unprocessed portion 348B generally includes a pattern, such as an array, of dispensed droplets, such as dispensed droplets 343 and 347, which are deposited on the surface 346A of the previously formed layer 346 by use of the printers 306B and 306A, respectively.

FIG. 3C is a close up cross-sectional view of a dispensed droplet 343 that is disposed on a surface 346A of the previously formed layer 346. Based on the properties of the materials within the dispensed droplet 343, and due to surface energy of the surface 346A the dispensed droplet will spread across the surface an amount that is larger than the size of the original dispensed droplet (e.g., droplets "A" or "B"), due to surface tension. The amount of spread of the dispensed droplet will vary as a function of time from the instant that it is deposited on the surface 346A. However, after a very short period of time (e.g., <1 second) the spread of the droplet will reach an equilibrium size, and have an equilibrium contact angle α. The spread of the dispensed droplet across the surface affects the resolution of the placement of the droplets on the surface of the growing polishing pad, and thus the resolution of the features and material compositions found within various regions of the final polishing pad.

In some implementations, it is desirable to expose one or both of the droplets "A" and "B" after they have been contact with the surface of the substrate for a period of time to cure, or "fix," each droplet at a targeted size before the droplet has a chance to spread to its uncured equilibrium size on the surface of the substrate. In this case, the energy supplied to the dispensed droplet, and surface that it is placed on, by the curing device 320 and the droplet's material composition are adjusted to control the resolution of each of the dispensed droplets. Therefore, one parameter to control or tune during a 3D printing process is the control of the dispensed droplet's surface tension relative to the surface that it is disposed on. In some implementations, it is desirable to add one or more curing enhancement components (e.g., photoinitiators) to the droplet's formulation to control the kinetics of the curing process, prevent oxygen inhibition, and/or control the contact angle of the droplet on the surface that it is deposited on. One will note that the curing enhancement components will generally include materials that are able to adjust: 1) the amount of bulk curing that occurs in the material in the dispensed droplet during the initial exposure to a targeted amount of electromagnetic radiation, 2) the amount of surface curing that occurs in the material in the dispensed droplet during the initial exposure to a targeted amount of electromagnetic radiation, and 3) the amount of surface property modification (e.g., additives) to the surface cured region of the dispensed droplet. The amount of surface property modification to the surface cured region of the dispensed droplet generally includes the adjustment of the surface energy of the cured or partially cured polymer found at the surface of the dispensed and at least partially cured droplet.

It has been found that it is desirable to partially cure each dispensed droplet to "fix" its surface properties and dimensional size during the printing process. The ability to "fix" the droplet at a desirable size can be accomplished by adding a targeted amount of at least one curing enhancement components to the droplet's material composition and delivering a sufficient amount of electromagnetic energy from the curing device 320 during the additive manufacturing process. In some implementations, it is desirable to use a curing device that is able to deliver between about 1 milli-joule per centimeter squared (mJ/cm$^2$) and 100 mJ/cm$^2$, such as about 10-20 mJ/cm$^2$, of ultraviolet (UV) light to the droplet during the additive layer formation process. The UV radiation may be provided by any UV source, such as mercury microwave arc lamps (e.g., H bulb, H+ bulb, D bulb, Q bulb, and V bulb type lamps), pulsed xenon flash lamps, high-efficiency UV light emitting diode arrays, and UV lasers. The UV radiation may have a wavelength between about 170 nm and about 500 nm.

In some implementations, the size of dispensed droplets "A", "B" may be from about 10 to about 200 microns, such as about 50 to about 70 microns. Depending on the surface energy (dynes) of the substrate or polymer layer that the droplet is dispensed over and upon, the uncured droplet may spread on and across the surface to a size 343A of between about 10 and about 500 microns, such as between about 50 and about 200 microns. In one example, the height of such a droplet may be from about 5 to about 100 microns, depending on such factors as surface energy, wetting, and/or resin precursor composition, which may include other additives, such as flow agents, thickening agents, and surfactants. One source for the additives is BYK-Gardner GmbH of Geretsried, Germany.

In some implementations, it is generally desirable to select a photoinitiator, an amount of the photoinitiator in the droplet composition, and the amount of energy supplied by curing device 320 to allow the dispensed droplet to be "fixed" in less than about 1 second, such as less than about 0.5 seconds after the dispensed droplet has come in contact with the surface on which it is to be fixed. The actual time it takes to partially cure the dispensed droplet, due to the exposure to delivered curing energy, may be longer or shorter than the time that the droplet resides on the surface before it is exposed to the delivered radiation, since the curing time of the dispensed droplet will depend on the amount of radiant energy and wavelength of the energy provide from the curing device 320. In one example, an exposure time used to partially cure a 120 micrometer (μm) dispensed droplet is about 0.4 microseconds (ps) for a radiant exposure level of about 10-15 mJ/cm$^2$ of UV radiation. In an effort to "fix" the droplet in this short timeframe the dispense nozzle of the droplet ejecting printer 306 is positioned a short distance from the surface of the polishing pad, such as between 0.1 and 10 millimeters (mm), or even 0.5 and 1 mm, while the surface 346A of the advanced polishing pad are exposed to the radiation 321 delivered from the curing device 320. It has also been found that by controlling droplet composition, the amount of cure of the previously formed layer (e.g., surface energy of the previously formed layer), the amount of energy from the curing device 320 and the amount of the photoinitiator in the droplet composition, the contact angle α of the droplet can be controlled to control the fixed droplet size, and thus the resolution of the printing process. In one example, the underlying layer cure may be a cure of about 70% acrylate conversion. A droplet that has been fixed, or at least partially cured, is also referred to herein as a cured droplet. In some implementations, the fixed droplet size 343A is between about 10 and about 200 microns. In some implementations, the contact angle, also referred to herein as the dynamic contact angle (e.g., non-equilibrium contact angle), for a "fixed" droplet can be desirably controlled to a value of at least 50°, such as greater than 55°, or even greater than 60°, or even greater than 70°.

The resolution of the pixels within a pixel chart that is used to form a layer, or a portion of a layer, by an additive manufacturing process can be defined by the average "fixed" size of a dispensed droplet. The material composition of a layer, or portion of a layer, can thus be defined by a "dispensed droplet composition", which a percentage of the total number of pixels within the layer, or portion of the layer, that include droplets of a certain droplet composition. In one example, if a region of a layer of a formed advanced polishing pad is defined as having a dispensed droplet composition of a first dispensed droplet composition of 60%, then 60% percent of the pixels within the region will include a fixed droplet that includes the first material composition. In cases where a portion of a layer contains more than one material composition, it may also be desirable to define the material composition of a region within an advanced polishing pad as having a "material composition ratio." The material composition ratio is a ratio of the number of pixels that have a first material composition disposed thereon to the number of pixels that have a second material composition disposed thereon. In one example, if a region was defined as containing 1,000 pixels, which are disposed across an area of a surface, and 600 of the pixels contain a fixed droplet of a first droplet composition and 400 of the pixels contain a fixed droplet of a second droplet composition then the material composition ratio would include a 3:2 ratio of the first droplet composition to the second droplet composition. In configurations where each pixel may contain greater than one fixed droplet (e.g., 1.2 droplets per pixel) then the material composition ratio would be defined by the ratio of the number of fixed droplets of a first material to the number of fixed droplets of a second material that are found within a defined region. In one example, if a region was defined as containing 1,000 pixels, and there were 800 fixed droplet of a first droplet composition and 400 fixed droplets of a second droplet composition within the region, then the material composition ratio would be 2:1 for this region of the advanced polishing pad.

The amount of curing of the surface of the dispensed droplet that forms the next underlying layer is a polishing pad formation process parameter, since the amount of curing in this "initial dose" affects the surface energy that the subsequent layer of dispensed droplets will be exposed to during the additive manufacturing process. The amount of the initial cure dose will also affect the amount of curing that each deposited layer will finally achieve in the formed polishing pad, due to repetitive exposure of each deposited layer to additional transmitted curing radiation supplied through the subsequently deposited layers, as they are grown thereon. It is generally desirable to prevent over curing of a formed layer, since it will affect the material properties of the over cured materials and/or the wettability of the surface of the cured layer to subsequently deposited dispensed droplets in subsequent processes. In one example, to effect polymerization of a 10-30 micron thick layer of dispensed droplets may be performed by dispensing each droplet on a surface and then exposing the dispensed droplet to UV radiation at a radiant exposure level of between about 10 and about 15 mJ/cm$^2$ after a period of time of between about 0.1 seconds and about 1 second has elapsed. However, in some implementations, the radiation level delivered during the initial cure dose may be varied layer by layer. For example, due to differing dispensed droplet compositions in different layers, the amount of UV radiation exposure in each initial dose may be adjusted to provide a desirable level of cure in the currently exposed layer, and to one or more of the underlying layers.

In some implementations, it is desirable to control the droplet composition and the amount of energy delivered from the curing device 320 during the initial curing process, which is a process in which the deposited layer of dispensed droplets are directly exposed to the energy provided by the curing device 320, to cause the layer to only partially cure a targeted amount. In general, it is desirable for the initial curing process to predominantly surface cure the dispensed droplet versus bulk cure the dispensed droplet, since controlling the surface energy of the formed layer helps control the dispensed droplet size. In one example, the amount that a dispensed droplet is partially cured can be defined by the amount of chemical conversion of the materials in the dispensed droplet. In one example, the conversion of the acrylates found in a dispensed droplet that is used to form a urethane polyacrylate containing layer, is defined by a percentage x, which is calculated by the equation:

$$x = 1 - \frac{(A_{C=C}/A_{C=O})_x}{(A_{C=C}/A_{C=O})_0},$$

where $A_{C=C}$ and $A_{C=O}$ are the values of the C=C peak at 910 cm$^{-1}$ and the C=O peaks at 1700 cm$^{-1}$ found using FT-IR spectroscopy. During polymerization, C=C bonds within acrylates are converted to C—C bond, while C=O within acrylates has no conversion. The intensity of C=C to C=O hence indicates the acrylate conversion rate. The $A_{C=C}/A_{C=O}$ ratio refers to the relative ratio of C=C to C=O bonds within the cured droplet, and thus the $(A_{C=C}/A_{C=O})_0$ denotes the initial ratio of $A_{C=C}$ to $A_{C=O}$ in the droplet, while $(A_{C=C}/A_{C=O})_x$ denotes the ratio of $A_{C=C}$ to $A_{C=O}$ on the surface of the substrate after the droplet has been cured. In some implementations, the amount that a layer is initially cured may be equal to or greater than about 70% of the dispensed droplet. In some configurations, it may be desirable to partially cure the material in the dispensed droplet during the initial exposure of the dispensed droplet to the curing energy to a level from about 70% to about 80%, so that the target contact angle of the dispensed droplet may be attained. It is believed that the uncured or partially acrylate materials on top surface are copolymerized with the subsequent droplets, and thus yield cohesion between the layers.

The process of partially curing a dispensed droplet during the initial layer formation process can also assure that there will be some chemical bonding/adhesion between subsequently deposited layers, due to the presence of residual unbonded groups, such as residual acrylic groups. Since the residual unbonded groups have not been polymerized, they can be involved in forming chemical bonds with a subsequently deposited layer. The formation of chemical bonds between layers can thus increase the mechanical strength of the formed advanced polishing pad in the direction of the layer by layer growth during the pad formation process (e.g., Z-direction in FIG. 3B). As noted above, the bonding between layers may thus be formed by both physical and/or chemical forces.

The mixture of the dispensed droplet, or positioning of the dispensed droplets, can be adjusted on a layer-by-layer basis to form layers that individually have tunable properties, and a polishing pad that has desirable pad properties that are a composite of the formed layers. In one example, as shown in FIG. 3B, a mixture of dispensed droplets includes a 50:50 ratio of the dispensed droplets 343 and 347 (or a material composition ratio of 1:1), wherein the dispensed droplet 343 includes at least one different material from the material found in the dispensed droplet 347. Properties of portions of the pad body 202, such as the first polishing element(s) 204 and/or second polishing element(s) 206 may be adjusted or tuned according to the ratio and/or distribution of a first composition and a second composition that are formed from the positioning of the dispensed droplets during the deposition process. For example, the weight % of the first composition may be from about 1% by weight based on total composition weight to about 100% based on total composition weight. In a similar fashion, the second composition may be from about 1% by weight based on total composition weight to about 100% based on total composition weight. Depending on the targeted material properties, such as hardness and/or storage modulus, compositions of two or more materials can be mixed in different ratios to achieve a targeted effect. In one implementation, the composition of the first polishing element(s) 204 and/or second polishing element(s) 206 is controlled by selecting at least one composition or a mixture of compositions, and size, location, and/or density of the droplets dispensed by one or more printers. Therefore, the electronic controller 305 is generally adapted to position the nozzles 309-310, 311-312 to form a layer that has interdigitated droplets that have been positioned in a targeted density and pattern on the surface of the polishing pad that is being formed. In some configurations, dispensed droplets may be deposited in such a way as to ensure that each drop is placed in a location where it does not blend with other drops, and thus each remains a discrete material "island" prior to being cured. In some configurations, the dispensed droplets may also be placed on top of prior dispensed droplets within the same layer to increase the build rate or blend material properties. Placement of droplets relative to each other on a surface may also be adjusted to allow partial mixing behavior of each of the dispensed droplets in the layer. In some cases, it may be desirable to place the droplets closer together or farther apart to provide more or less mixing of the components in the neighboring droplets, respectively. It has been found that controlling droplet placement relative to other dispensed droplets and the composition of each droplet can have an effect on the mechanical and polishing properties of the formed advanced polishing pad.

In some configurations, dispensed droplets of at least two different resin precursor compositions may be deposited in such a way as to ensure that each drop is placed in a location on the surface where it does not blend with other drops, and thus each remains a discrete material "island" prior to being cured. In one configuration, each of the at least two resin precursor compositions are formulated to provide a material that has a different zeta potential, so that the average zeta potential over a targeted area of a surface of the formed polishing pad can be adjusted and/or controlled by adjusting the percentage of droplets of each type of resin precursor composition within the targeted area. Additionally or alternately, the placement of the droplets in the at least two different resin precursor compositions is adjusted to allow at least partial mixing of each of the dispensed droplets in the deposited layer. Thus, in the case where each of the at least two resin precursor compositions are formulated to provide a material having different zeta potential, and the average zeta potential over a targeted area of a surface of the formed polishing pad can be adjusted and/or controlled by adjusting the amount of intermixing of dispensed droplets of each type of resin precursor composition within at least a portion of the targeted area.

Even though only two compositions are generally discussed herein for forming the first polishing element(s) 204 and/or second polishing element(s) 206, implementations of the present disclosure encompass forming features on a polishing pad with a plurality of materials that are interconnected via compositional gradients. In some configurations, the composition of the first polishing element(s) 204 and/or second polishing element(s) 206 in a polishing pad are adjusted within a plane parallel to the polishing surface and/or through the thickness of the polishing pad, as discussed further below.

The ability to form compositional gradients and the ability to tune the chemical content locally, within, and across an advanced polishing pad are enabled by "ink jettable" low viscosity compositions, or low viscosity "inks" in the 3D printing arts that are used to form the droplets "A" and/or "B" illustrated in FIG. 3B. The low viscosity inks are "pre-polymer" compositions and are the "precursors" to the formed first polishing element(s) 204 and second polishing element(s) 206 found in the pad body 202. The low viscosity inks enable the delivery of a wide variety of chemistries and discrete compositions that are not available by conventional techniques (e.g., molding and casting), and thus enable controlled compositional transitions or gradients to be formed within different regions of the pad body 202. This is achieved by the addition and mixing of viscosity thinning reactive diluents to high viscosity functional oligomers to achieve the appropriate viscosity formulation, followed by copolymerization of the diluent(s) with the higher viscosity functional oligomers when exposed to a curing energy delivered by the curing device 320. The reactive diluents may also serve as a solvent, thus eliminating the use of inert non-reactive solvents or thinners that are removed at each process.

Referring to the precursor delivery section 353 and precursor formulation section 354 of FIG. 3A, in one implementation, a first precursor 356 is mixed with a second precursor 357 and a diluent 358 to form a first printable ink composition 359, which is delivered to reservoir 304B of the printer 306B, and used to form portions of the pad body 202. Similarly, a third precursor 366 can be mixed with a fourth precursor 367 and a diluent 368 to form a second new printable ink composition 369, which is delivered to reservoir 304A of the printer 306A, and used to form another portion of the pad body 202. In some implementations, the first precursor 356 and the third precursor 366 each comprise an oligomer, such as multifunctional oligomer, the second precursor 357 and the fourth precursor 367 each comprise a multifunctional monomer, and diluent 358 and the diluent 368 each comprise a reactive diluent (e.g., monomer) and/or initiator (e.g., photoinitiator). One example of a first printable ink composition 359 may include a first precursor 356 which includes a reactive difunctional oligomer, comprising aliphatic chain segments, which may have a viscosity from about 1000 centipoise (cP) at 25° C., to about 12,000 cP at 25° C., is then mixed with and thus diluted by a 10 cP at 25° C. reactive diluent (e.g., diluent 358), such as monoacrylate, to create a new composition that has new viscosity. The printable composition thus obtained may exhibit a viscosity from about 80 cP to about 110 cP at 25° C., and a viscosity from about 15 cP to about 30 cP at 70° C., which may be effectively dispensed from a 3D printer ink jet nozzle.

Figure 3D:
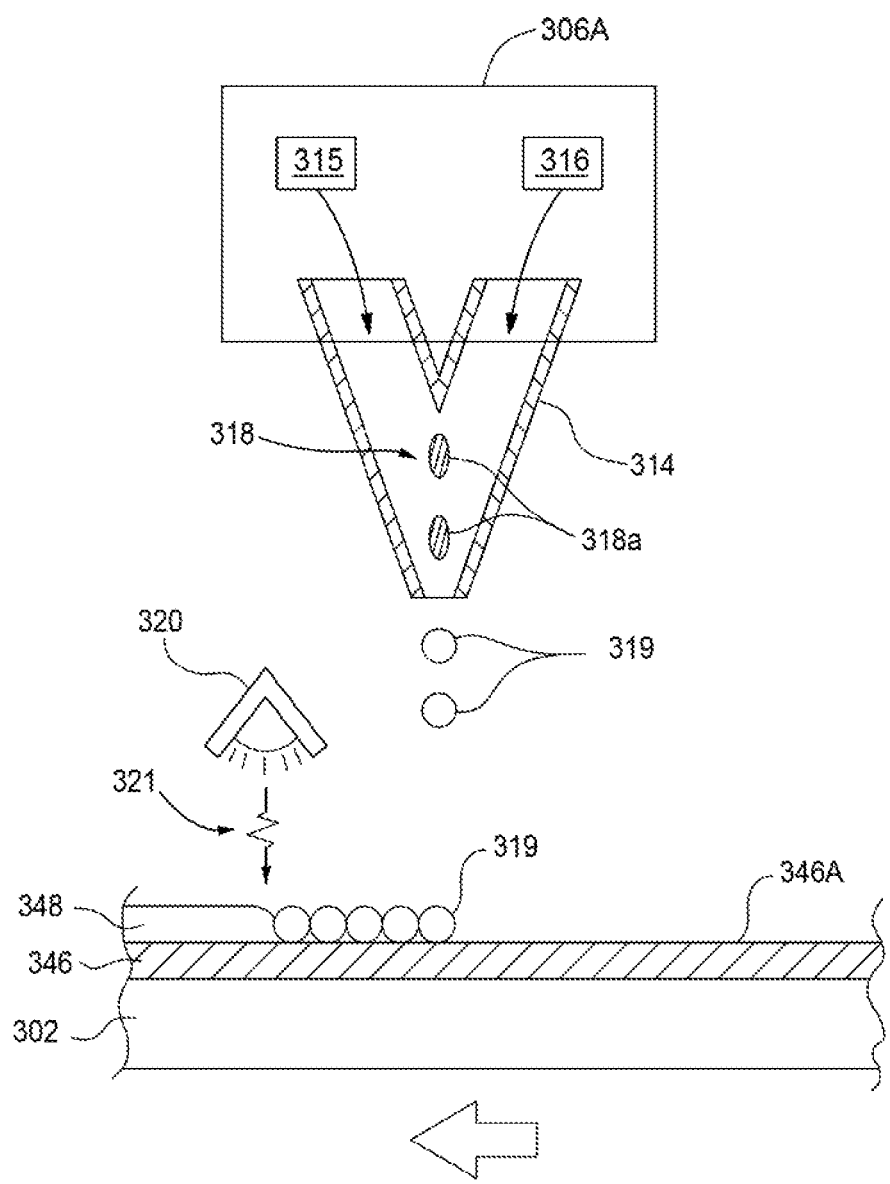
FIG. 3D is a schematic view of a nozzle assembly used in a system for manufacturing advanced polishing pads, according to one or more implementations of the present disclosure.

FIG. 3D is a schematic view of a nozzle assembly that can be used to mix and dispense one or more of the resin precursor components, such as a part A and a part B for polymerization, according to one implementation of the present disclosure. As shown, the droplet ejecting printer 306A may contain a nozzle 314, and a reservoir 315 and a reservoir 316 that each deliver at least one resin precursor component to a mixing region 318. The resin precursor components delivered to the mixing region 318 are mixed at the point of use by turbulence inducing elements 318a to form one or more droplets 319 that contains a mixture of the mixed resin precursor composition. The turbulence inducing elements 318a may also include a spiral tortuous path through which the resin precursor components are mixed. In another implementation, the mixture may be premixed and contained in a single reservoir. After mixing, the droplets 319 are delivered to a surface of a substrate, such as a polishing article, as illustrated in FIGS. 3A-3B and 3D. After dispense of the mixed resin precursor components, the droplets are cured. It is noted that the containment, mixing and dispense schemes illustrated in FIG. 3D may be suitable for any of the chemistries described herein.

Figure 4B:
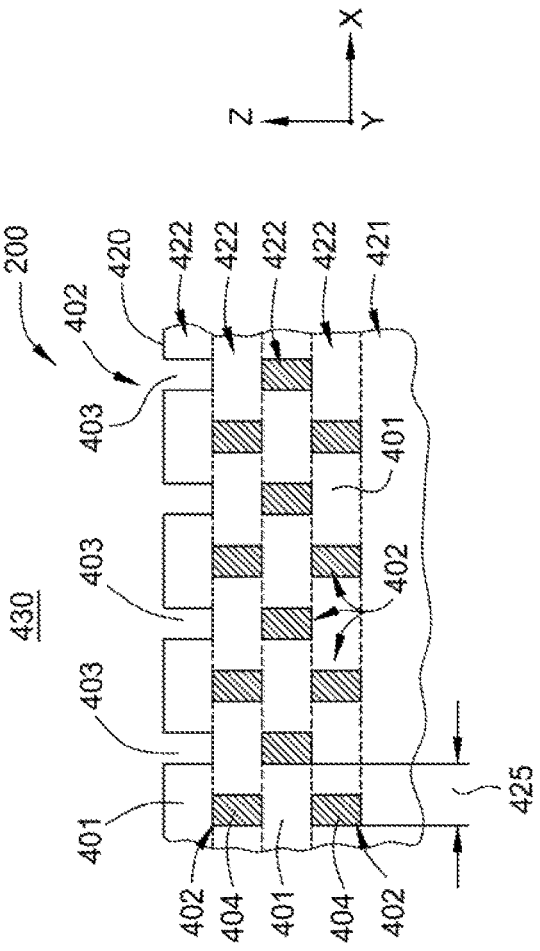
FIG. 4B is a schematic side cross-sectional view of a portion of an advanced polishing pad, according to an implementation of the present disclosure.
Figure 4C:
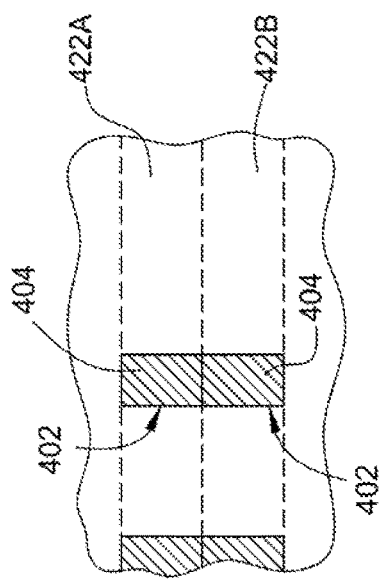
FIG. 4C is a schematic side cross-sectional view of a portion of an advanced polishing pad, according to an implementation of the present disclosure.
Figure 4A:
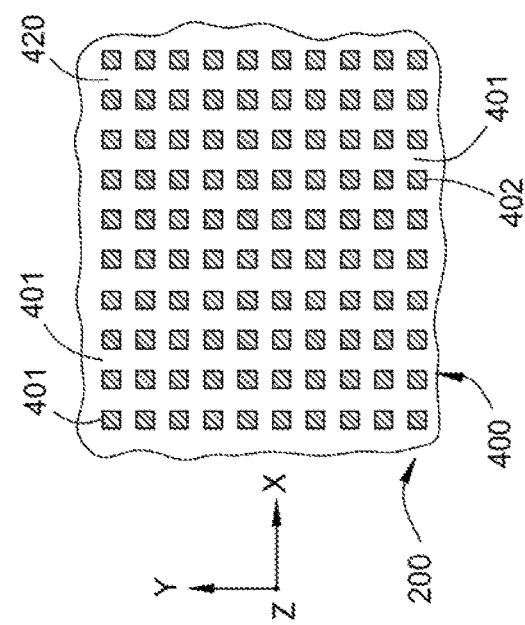
FIG. 4A is a top view of a pixel chart used to form an advanced polishing pad that may contain pores, according to at least one implementation of the present disclosure.

FIG. 4A illustrates a schematic plan view of a pixel chart that is used to form a region 400 of a layer 422 (FIG. 4B) of a first or a second polishing element of a polishing pad that contains pore-forming regions according to one or more implementations of the present disclosure. In this example, the pixel chart includes a rectangular pattern of pore-forming regions 402 that are formed by dispensing one or more droplets of a porosity-forming agent 404 (FIG. 4B) from a first print head onto a surface and then at least partially surrounding the pore-forming regions 402 with one or more structural material-containing regions 401 that include a material that is formed by dispensing droplets of one or more resin precursor compositions from at least a second print head. The porosity-forming agent 404 can then later be removed in a post-processing operation or during a polishing process to form pores in one or more layers of the polishing pad. In one example, the porosity-forming agent material is removed from formed advanced polishing pad when the polishing pad is used in a CMP polishing process. In this example, the porosity-forming agent material may be removed due to the interaction of the porosity-forming agent disposed at a surface 420 of the first or second polishing element(s) in the advanced polishing pad with one or more components found within a slurry that is disposed between the first and/or second polishing element(s) and a substrate that is being polished. As shown in FIG. 4A, the pore-forming regions 402 are surrounded by the structural material-containing region 401 that is formed by dispensing droplets of a resin-precursor formulation across a surface on which the layer 422 is formed. By use of the various techniques described herein, compositional gradients in the cured structural material found within the structural material-containing region 401 and/or gradients in the size and density of the pore-forming regions 402 can be used to form at least part of a complete polishing pad that has desirable mechanical and thermal properties. The composition of the pore-forming material disposed within the pore-forming regions 402 and distribution and size of the pore-forming regions 402 across of the porous polishing pad 200 (i.e., X-Y plane) or through the thickness of the polishing element (i.e., Z direction) may vary in any suitable pattern. Although polishing pads described herein are shown to be formed from two kinds of materials, this configuration is not intended to be limiting of the scope of the disclosure provided herein, since polishing pads including three or more kinds of materials is within the scope of the present disclosure. It should be noted that the compositions of the structural material found within a polishing pad, such as the polishing pad designs illustrated in FIGS. 2A-2K. Thus, in some implementations, the material found within a formed structural material-containing region 401 may include a mixture of two or more different materials that varies in one or more directions across (e.g., X and/or Y direction) or through (e.g., Z direction) the formed layer.

FIG. 4B is a side cross-sectional view of a portion of the region 400 illustrated in FIG. 4A according to one or more aspects of the present disclosure. The portion shown in FIG. 4B includes a plurality of layers 422 that are formed on an optional base layer 421 by use of an additive manufacturing process as described herein. For clarity of discussion purposes, the layers are shown in FIG. 4B as being disposed between two dashed lines, however, due to the processes described herein at least the structural material-containing region 401 parts of adjacent layers may be formed such that there is no distinct physical division between layers in a formed porous advanced polishing pad 200. The layers 422 each include pore-forming regions 402 that are interspersed between regions of the structural material-containing region 401. Due to the interaction of the porosity-forming agent disposed within the pore-forming regions 402 at the surface 420 (e.g., polishing surface 112) of the porous advanced polishing pad 200 with a slurry (not shown), which is disposed within a polishing region 430, the porosity-forming agent 404 may be easily removed leaving an unfilled void within the pore-forming regions 402, and thus forming a pore 403.

In one implementation, the pixel charts used to form each layer 422 includes pattern that includes an array of porosity-forming agent 404 containing pore-forming regions 402 that are formed in a targeted pattern across the surface of the formed layer. As noted above, in some implementations, the pattern of porosity-forming agent 404 containing pore-forming regions 402 can be formed in a rectangular array that has a desirable pitch in both the X and Y directions. However, the pattern of porosity-forming agent 404 containing pore-forming regions 402 may be formed in any desirable pattern including a hexagonal array of pore-forming regions 402, a directionally varying pattern of pore-forming regions 402, a random pattern of pore-forming regions 402 or other useful pattern of pore-forming regions 402. In some implementations, the pixel charts used to form adjacent layers 422 are shifted a targeted distance 425 in one or more directions (e.g., X, Y or X and Y directions) relative to each other, or formed in differing relative X-Y patterns, so that the pore-forming regions 402 are not placed on top of each other in adjacently positioned layers as the polishing pad is formed. In one implementation, similarly configured patterns of pore-forming regions 402 in adjacent layers may be staggered a targeted distance in one or more directions relative to each other so that the pore-forming regions 402 are not placed on top of each other in the adjacently positioned layers.

FIG. 4C illustrates is a side cross-sectional view of a portion of the region 400 illustrated in FIG. 4A according to another aspect of the present disclosure. In some implementations, two or more of the deposited layers may be aligned with each other so that the layers are formed directly on top of each other. In one example, as shown in FIG. 4C, two layers 422A and 422B are formed so that the 422A layer is directly on top of the layer 422B so that the pore-forming regions 402 are placed one on top of the other. The next or subsequent layers may then be shifted a targeted distance 425 relative to the layers 422A-B, so that the pore-forming regions 402 in the subsequent layers are not placed on top of the layers 422A-B. The implementations in which two or more layers, within a larger stack of layers, are formed directly on top of each other may be useful in cases where the fixed droplet size resolution in the X and Y directions may be greater than the thickness of the layer in the Z direction. In one example, the fixed droplet size in the X and Y directions is twice as large as the thickness in the Z direction, thus allowing a regular pattern of printed material to be formed in the X, Y and Z directions when two layers are placed on top of each other.

Referring back to FIG. 4A, the pixel charts used to form the pore-forming regions 402 and the surrounding structural material-containing region 401 within a layer can be used to create portions of the polishing features that have a consistent or varying porosity in one or more directions X, Y, or Z. In one example, the polishing features near an edge region of the advanced polishing pad may include more of the resin precursor formulation used to form the structural material within the structural material-containing region 401 than the porosity-forming agent 404 containing pore-forming regions 402. The polishing features near a center region of the polishing pad may also include a higher percentage of pore-forming regions 402 per layer (e.g., higher density) than the polishing features near the edge region. In this example, each polishing feature of the same type (e.g., first polishing element(s) 204), or of different types (e.g., first and second polishing element(s) 204, 206), has a unique combination of the resin precursor formulation, the porosity-forming agent and the density of the pore-forming regions 402 per layer and/or per polishing element. In one example, the first polishing element(s) 204 include a first combination of the resin precursor formulation and the porosity-forming agent and the second polishing element(s) 206 include a different second combination of the resin precursor formulation and the porosity-forming agent. Therefore, by use of pixel charts, the polishing body can be sequentially formed so that a targeted porosity gradient is achieved in different parts of the polishing body to achieve a targeted polishing performance of the advanced polishing pad.

A method of forming a layer of a porous advanced polishing pad according to implementations described herein may include the following operations. First, one or more droplets of a curable resin precursor composition including a cationic monomer, such as described herein, are dispensed in a targeted X and Y pattern to form the structural material portion of a formed layer. In one implementation, the one or more droplets of the resin precursor composition are dispensed on a support if the one or more droplets constitute a first layer. In some implementations, the one or more droplets of the resin precursor composition are dispensed on a previously deposited layer (e.g., second layer, etc.). Second, one or more droplets of a porosity-forming composition containing a porosity-forming agent are dispensed in a targeted X and Y pattern to form the pore-forming regions within the formed layer. In one implementation, the one or more droplets of the porosity-forming composition are dispensed on a support if the one or more droplets constitute a first layer. In some implementations, the one or more droplets of the porosity-forming composition are dispensed on a previously deposited layer. The dispensing processes of the first and second operations are typically performed separately in time and at different X-Y coordinates. Next, or third, the dispensed one or more droplets of the curable resin precursor composition and the dispensed one or more droplets of the porosity-forming composition are at least partially cured. Next, at the optional fourth operation, the dispensed one or more droplets of the curable resin precursor and the dispensed one or more droplets of the porosity-forming composition are exposed to at least one of an annealing process, a rinsing process, or both to remove the porosity-forming agent. The rinsing process may include rinsing with water, another solvent such as alcohol (e.g., isopropanol) or both. The annealing process may include heating the deposited pad structure to a low temperature (e.g., about 100 degrees Celsius) under a low pressure to vaporize the porosity-forming agent. Next, at the fifth operation, an optional second curing process is performed on the formed layer or final pad to form the final porous pad structure. In some cases, the first, second, third and fifth processing operations may also be sequentially repeated in any targeted order to form a number of stacked layers before the fourth operation is completed.

Figure 5:
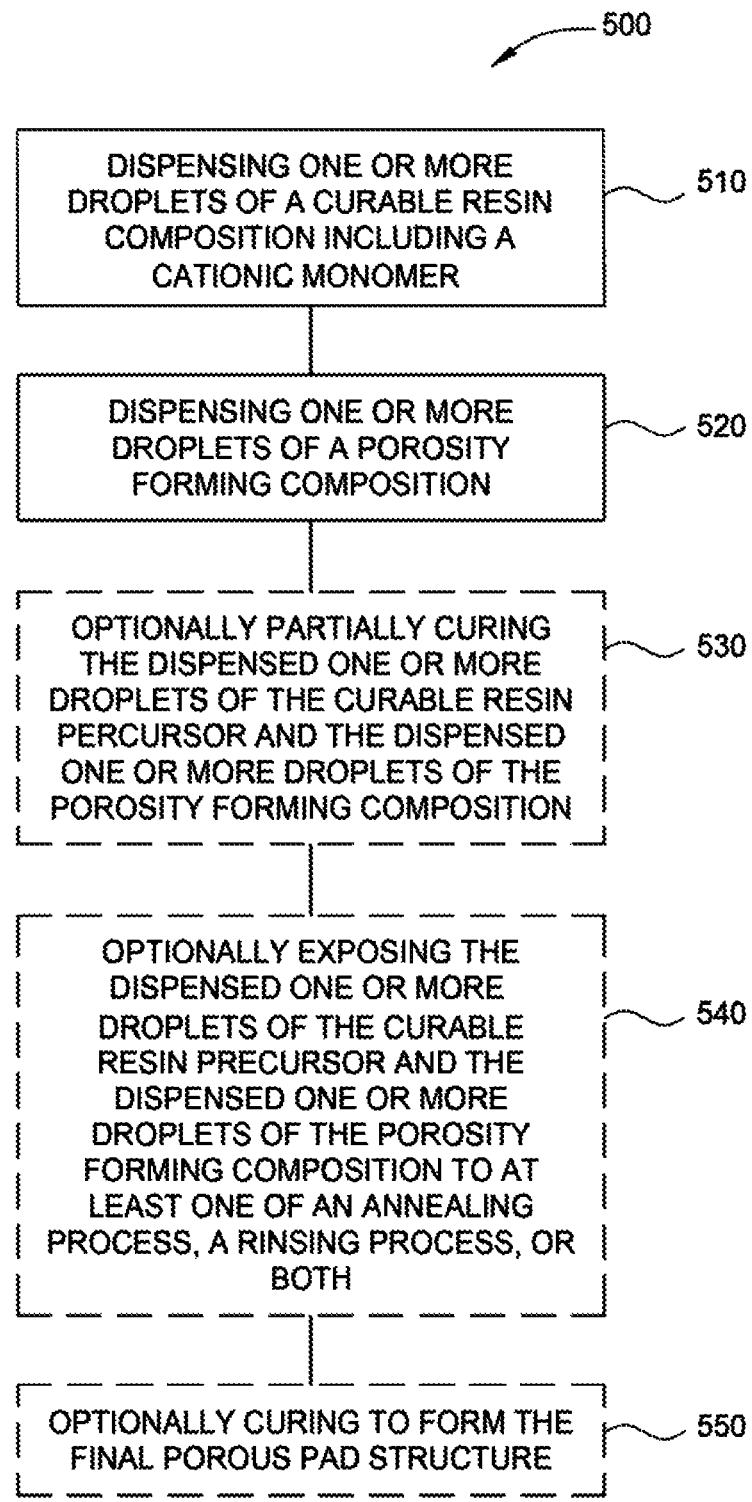
FIG. 5 is a flow chart depicting a method of forming an advanced polishing pad according to implementations described herein.

FIG. 5 is a flow chart depicting a method 500 of forming a porous pad according to implementations described herein. At operation 510, one or more droplets of a resin precursor composition comprising a cationic monomer are dispensed. In one implementation, the one or more droplets of the resin precursor composition are dispensed on a support if the one or more droplets constitute a first layer. In some implementations, the one or more droplets of the resin precursor composition are dispensed on a previously deposited layer. At operation 620, one or more droplets of a porosity-forming composition containing a porosity-forming agent are dispensed. In one implementation, the one or more droplets of the porosity-forming composition are dispensed on the support if the one or more droplets constitute a first layer. In some implementations, the one or more droplets of the porosity-forming composition are dispensed on a previously deposited layer. The dispensing processes of operation 510 and operation 520 are typically performed separately. Optionally, at operation 530, the dispensed one or more droplets of the curable resin precursor and the dispensed one or more droplets of the porosity-forming composition are partially cured. Operations 510, 520, and 530 may be repeated to form a 3-D relief. Optionally, at operation 540, the dispensed one or more droplets of the curable resin precursor and the dispensed one or more droplets of the porosity-forming composition are exposed to at least one of an annealing process, a rinsing process, or both to remove the porosity-forming agent. The rinsing process may include rinsing with water, another solvent such as alcohol (e.g., isopropanol) or both. The annealing process may include heating the deposited pad structure to a low temperature (e.g., about 100 degrees Celsius) under a low pressure to vaporize the porosity-forming agent. At operation 550, an optional curing process is performed to form the final porous pad structure.

Unless particularly stated otherwise in the following description, the unit "parts" represents "parts by weight," and the unit "percent (%)" represents "percent (%) by mass."

In some implementations, a method of forming a polishing pad is provided. The method comprises depositing a plurality of composite layers with a 3D printer to reach a target thickness. Depositing the plurality of composite layers comprises dispensing one or more droplets of a curable resin precursor composition onto a support. The curable resin precursor composition comprises

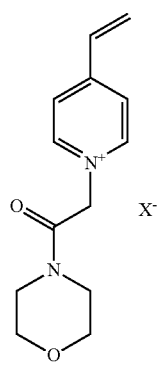

(II)

wherein X⁻ may is selected from the group of OH⁻, CH₃COO⁻, CF₃COO⁻, CH₃SO₃⁻, or CF₃SO₃⁻.

In some implementations, the method further comprises dispensing one or more droplets of a porosity-forming composition onto the support, wherein at least one component of the porosity-forming composition is removable to form the pores in the porous polishing pad.

In some implementations, the porosity-forming composition includes a porosity-forming agent selected from glycols, glycol-ethers, amines, and combinations thereof.

In some implementations, the porosity-forming composition includes a porosity-forming agent selected from ethylene glycol, butanediol, dimer diol, propylene glycol-(1,2), propylene glycol-(1,3), octane-1,8-diol, neopentyl glycol, cyclohexane dimethanol (1,4-bis-hydroxymethylcyclohexane), 2-methyl-1,3-propane diol, glycerin, trimethylolpropane, hexanediol-(1,6), hexanetriol-(1,2,6) butane triol-(1,2,4), trimethylolethane, pentaerythritol, quinitol, mannitol and sorbitol, methylglycoside, diethylene glycol, triethylene glycol, tetraethylene glycol, polyethylene glycols, dibutylene glycol, polybutylene glycols, ethylene glycol, ethylene glycol monobutyl ether (EGMBE), diethylene glycol monoethyl ether, ethanolamine, diethanolamine (DEA), triethanolamine (TEA) and combinations thereof.

In some implementations, the curable resin precursor composition further comprises a first resin precursor component that comprises a multifunctional acrylate oligomer and a second resin precursor component that comprise a multifunctional acrylate monomer.

In some implementations, the method further comprises partially curing the dispensed one or more droplets of the curable resin precursor composition and the dispensed one or more droplets of the porosity-forming composition prior to exposing the dispensed one or more droplets of the curable resin precursor composition and the dispensed one or more droplets of the porosity-forming composition to at least one of an annealing processing, a rinsing process, or both.

In some implementations, a polishing article formed according to any of the methods described herein is provided.

In some implementations, one or more exposed surfaces of the polishing article have a positive zeta potential.

In some implementations, the positive zeta potential of the polishing article ranges from about 0 mV to about 100 mV.

In some implementations, a method of forming a polishing pad is provided. The method comprises depositing a plurality of composite layers with a 3D printer to reach a target thickness. Depositing the plurality of composite layers comprises dispensing one or more droplets of a first curable resin precursor composition onto a support. The first curable resin precursor composition comprises a first resin precursor component that comprises a multifunctional acrylate oligomer, a second resin precursor component that comprise a multifunctional acrylate monomer, and a first cationic monomer having the structure

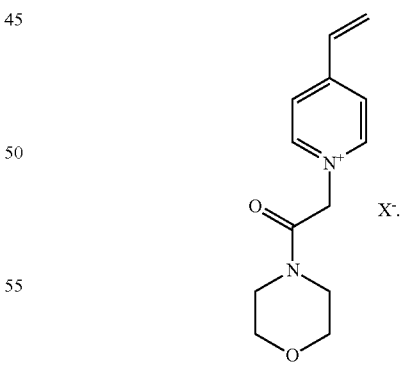

Depositing the plurality of composite layers further comprises dispensing one or more droplets of a second curable resin precursor composition onto a support. The second curable resin precursor composition comprises a third resin precursor component that comprises a multifunctional acrylate oligomer, a fourth resin precursor component that comprise a multifunctional acrylate monomer, and a second cationic monomer having the structure

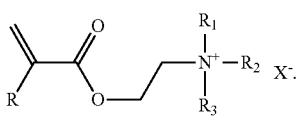

The method further comprises exposing the one or more droplets of the first curable resin precursor composition and one or more droplets of the second precursor composition to radiation to at least partially cure the curable first and second resin precursor composition. The cured one or more droplets of the first curable resin has a first zeta potential and the cured one or more droplets of the second resin precursor composition has a second zeta potential different from the first zeta potential. The method further comprises repeating the dispensing and exposing to build a 3D-relief on the support.

In some implementations, at least a portion of the one or more droplets of the first curable resin and the one or more droplets of the second curable resin mix prior to exposing the one or more droplets of the first curable resin precursor composition and the one or more droplets of the second precursor composition to radiation.

The Tg of a monomer in the following description refers to the glass transition temperature of a homopolymer of the monomer.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the present disclosure may be devised without departing from the basic scope thereof, and the scope thereof is determined by the claims that follow.

The invention claimed is:

1. A method of forming a polishing pad, comprising:
depositing a plurality of composite layers with a 3D printer to reach a target thickness, wherein depositing the plurality of composite layers comprises:
dispensing one or more droplets of a curable resin precursor composition onto a support, wherein the curable resin precursor composition comprises:
a multifunctional acrylate oligomer;
one or more acrylate monomers; and
a cationic monomer having the structure:

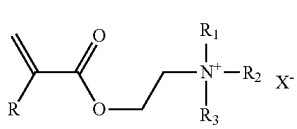

(I)

wherein R is H, $R_1$, $R_2$, and $R_3$ are identical or different and are each, independently of one another, a linear or branched $C_1$ to $C_8$ alkyl group, and wherein $X^-$ is selected from $OH^-$, $CH_3COO^-$, $CF_3COO^-$, $CH_3SO_3^-$, or $CF_3SO_3^-$; and
solidifying the plurality of composite layers to form a pad body, wherein a hydrophobic portion of the cationic monomer is embedded in a pad matrix of the pad body and a hydrophilic portion of the cationic monomer is exposed on a pad surface of the pad body.

2. The method of claim 1, further comprising:
dispensing one or more droplets of a porosity-forming composition onto the support, wherein at least one component of the porosity-forming composition is removable to form the pores in the polishing pad.

3. The method of claim 1, wherein $R_1$, $R_2$, and $R_3$ are each independently selected from a $C_1$ to $C_2$ alkyl group.

4. The method of claim 1, wherein $R_1$ and $R_2$ are $CH_3$, and $R_3$ is $CH_2CH_3$.

5. The method of claim 1, wherein $R_1$, $R_2$, and $R_3$ are $CH_3$.

6. The method of claim 4, wherein $X^-$ is $CH_3SO_3^-$.

7. The method of claim 2, wherein the porosity-forming composition comprises a porosity-forming agent selected from glycols, glycol-ethers, amines, and combinations thereof.

8. The method of claim 2, wherein the porosity-forming composition comprises a porosity-forming agent selected from ethylene glycol, butanediol, dimer diol, propylene glycol-(1,2), propylene glycol-(1,3), octane-1,8-diol, neopentyl glycol, cyclohexane dimethanol (1,4-bis-hydroxymethylcyclohexane), 2-methyl-1,3-propane diol, glycerin, trimethylolpropane, hexanediol-(1,6), hexanetriol-(1,2,6), butane triol-(1,2,4), trimethylolethane, pentaerythritol, quinitol, mannitol, sorbitol, methylglycoside, diethylene glycol, triethylene glycol, tetraethylene glycol, polyethylene glycol, dibutylene glycol, polybutylene glycol, ethylene glycol monobutyl ether (EGMBE), diethylene glycol monoethyl ether, ethanolamine, diethanolamine (DEA), triethanolamine (TEA) and combinations thereof.

9. The method of claim 2, further comprising partially curing the dispensed one or more droplets of the curable resin precursor composition and the dispensed one or more droplets of the porosity-forming composition prior to exposing the dispensed one or more droplets of the curable resin precursor composition and the dispensed one or more droplets of the porosity-forming composition to at least one of an annealing processing, a rinsing process, or both.

10. A method of forming a polishing pad, comprising:
depositing a plurality of composite layers with a 3D printer to reach a target thickness, wherein depositing the plurality of composite layers comprises:
dispensing one or more droplets of a curable resin precursor composition onto a support, wherein the curable resin precursor composition comprises:
a first resin precursor component that comprises a multifunctional acrylate oligomer;
a second resin precursor component that comprise a multifunctional acrylate monomer; and
a cationic monomer having the structure:

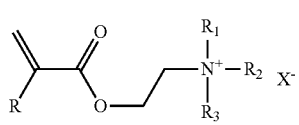

(I)

wherein R is H, $R_1$, $R_2$, an $R_3$ are identical or different and are each, independently of one another, a linear or branched $C_1$ to $C_8$ alkyl group, and wherein $X^-$ is selected from $OH^-$, $CH_3COO^-$, $CF_3COO^-$, $CH_3SO_3^-$, or $CF_3SO_3$;
exposing the one or more droplets of the curable resin precursor composition to electromagnetic radiation to at least partially cure the curable resin precursor composition; and repeating the dispensing and exposing to build a 3D-relief on the support; and solidifying the plurality of composite layers to form a pad body, wherein a hydrophobic portion of the cationic monomer is embedded in a pad matrix of the pad body and a hydrophilic portion of the cationic monomer is exposed on a pad surface of the pad body.

11. The method of claim 10, wherein $R_1$, $R_2$, and $R_3$ are each independently selected from a $C_1$ to $C_2$ alkyl group.

12. The method of claim 10, wherein $R_1$ and $R_2$ are $CH_3$, and $R_3$ is $CH_2CH_3$.

13. The method of claim 10, wherein $R_1$, $R_2$, and $R_3$ are $CH_3$.

14. The method of claim 12, wherein $X^-$ is $CH_3SO_3^-$.

15. The method of claim 10, wherein the curable resin precursor composition further comprises a porosity-forming agent selected from glycols, glycol-ethers, amines, and combinations thereof.

16. The method of claim 10, wherein the curable resin precursor composition further comprises a curing agent that comprises a photoinitiator.

17. The method of claim 10, wherein the cationic monomer is present in a range between 5 wt. % to about 30 wt. % of a total wt. % of the curable resin precursor composition.

18. The method of claim 1, wherein the cationic monomer is present in a range between 25 wt. % to about 30 wt. % of a total wt. % of the curable resin precursor composition.

19. The method of claim 10, wherein the cationic monomer is present in a range between 25 wt. % to about 30 wt. % of a total wt. % of the curable resin precursor composition.

\* \* \* \* \*